US012146348B2

(12) United States Patent
Philippe et al.

(10) Patent No.: US 12,146,348 B2
(45) Date of Patent: Nov. 19, 2024

(54) VEHICLE DOOR LATCH

(71) Applicants: Inteva France SAS, Sully sur Loire (FR); Inteva Products, LLC, Troy, MI (US)

(72) Inventors: Pascal Philippe, Orléans (FR); Yoshihiko Tametani, Tokyo (JP); Jean-Marc Belmond, Saint-Jean le Blanc (FR)

(73) Assignees: INTEVA FRANCE SAS, Sully sur Loire (FR); INTEVA PRODUCTS, LLC, Troy, MI (US)

( * ) Notice: Subject to any disclaimer, the term of this patent is extended or adjusted under 35 U.S.C. 154(b) by 242 days.

(21) Appl. No.: 17/744,317

(22) Filed: May 13, 2022

(65) Prior Publication Data

US 2022/0364393 A1 Nov. 17, 2022

(30) Foreign Application Priority Data

May 14, 2021 (FR) ..................................... 21/05087

(51) Int. Cl.
*E05B 77/12* (2014.01)
*E05B 81/14* (2014.01)
*E05B 81/30* (2014.01)

(52) U.S. Cl.
CPC .............. *E05B 77/12* (2013.01); *E05B 81/14* (2013.01); *E05B 81/30* (2013.01)

(58) Field of Classification Search
CPC .......... E05B 77/00; E05B 77/02; E05B 77/12; E05B 81/00; E05B 81/14; E05B 81/15; E05B 81/24; E05B 81/26; E05B 81/30
USPC ........................................................... 70/264
See application file for complete search history.

(56) References Cited

U.S. PATENT DOCUMENTS

| | | | | |
|---|---|---|---|---|
| 11,035,157 | B2 | 6/2021 | Cumbo | |
| 11,377,883 | B2 | 7/2022 | Taurasi et al. | |
| 11,525,290 | B2 | 12/2022 | Nam et al. | |
| 11,572,717 | B2 | 2/2023 | Robert | |
| 2015/0021934 | A1* | 1/2015 | Barmscheidt ........... | E05B 81/90 292/336.3 |
| 2016/0017645 | A1* | 1/2016 | Tomaszewski ......... | E05B 81/90 292/240 |
| 2018/0002955 | A1* | 1/2018 | Ottolini ................... | E05B 81/66 |
| 2018/0340359 | A1* | 11/2018 | Cumbo ................... | E05B 81/42 |

(Continued)

FOREIGN PATENT DOCUMENTS

| | | | |
|---|---|---|---|
| CN | 108930462 | A | 12/2018 |
| CN | 109989637 | A | 7/2019 |
| CN | 111663864 | A | 9/2020 |

(Continued)

OTHER PUBLICATIONS

Chinese Office Action dated Aug. 7, 2023; CN Application No. 202210528512.X; 10 pages (English).

(Continued)

*Primary Examiner* — Nathan Cumar
(74) *Attorney, Agent, or Firm* — CANTOR COLBURN LLP

(57) ABSTRACT

A vehicle latch, including: a claw rotatably mounted to a pin; a pawl rotatably mounted to pin; a single motor for electrically releasing the claw of the latch and for electrically moving the latch into an emergency mode wherein the latch can be mechanically opened via a handle operably coupled to the latch.

14 Claims, 21 Drawing Sheets

E release
release side of the wheel

Electric Release (Full Travel) – Wheel driven in clockwise direction on its stop

(56) References Cited

U.S. PATENT DOCUMENTS

| | | | | |
|---|---|---|---|---|
| 2020/0190861 | A1* | 6/2020 | Margheritti | E05B 85/26 |
| 2020/0284069 | A1 | 9/2020 | Nam et al. | |

FOREIGN PATENT DOCUMENTS

| | | | |
|---|---|---|---|
| CN | 111699295 | A | 9/2020 |
| DE | 10048709 | A1 | 4/2002 |
| DE | 102017124521 | A1 | 4/2019 |
| EP | 2792829 | A2 | 10/2014 |
| WO | 2018006896 | A1 | 1/2018 |
| WO | 2019076399 | A1 | 4/2019 |
| WO | 2020224707 | A1 | 11/2020 |

OTHER PUBLICATIONS

Chinese Office Action dated Aug. 7, 2023; CN Application No. 202210528512.X; 9 pages (non-English).

Preliminary Search Report for French Application No. 21/05087 Issued Dec. 9, 2021; 2 pages.

Written Opinion for French Application No. 21/05087; Date of Filing: May 14, 2021; 4 Pages.

* cited by examiner

Door Closed Normal Condition - Release Side of wheel

Door Closed Normal Condition – Retention engaged, ready for E-release
Emergency back up disengaged Door Closed Normal Condition — Stops control side of the wheel Door Latch Kinematics Electric Release – Actuator View, with wheel turning clock wise Electric Release – Retention View (Claw in Closed Position, pawl disengaged from the claw)

Electric Release - Retention View (Claw in Secondary Position, pawl disengaged from the claw)

Electric Release – Retention View (Claw in Open Position, pawl still disengaged from the claw)

Electric Release (Full Travel) – Wheel driven in clockwise direction, but on a stop Electric Release (Full Travel) – Wheel driven in clockwise direction on its stop Wheel Return to Rest(Door Opened) – Driving side of the wheel Wheel Return to Rest(Door Opened) – Stops control side of the wheel Latch now in emergency mode Wheel at rest door closed Emergency backup for outside release – Actuator View Emergency mode for outside mechanical release Emergency mode (Mechanical Outside release)

Emergency mode (Door open)

Emergency mode (Door closing)

Emergency mode – Outside Release Available

Emergency lock – Outside Release Deactivated

VEHICLE DOOR LATCH

CROSS REFERENCE TO RELATED APPLICATIONS

The present application claims priority under 35 U.S.C. § 119 to the following French Patent Application No. FR 21/05087, filed on May 14, 2021, the entire contents of which are incorporated herein by reference thereto

BACKGROUND

Exemplary embodiments of the present disclosure pertain to the art of vehicle door latches.

Vehicle door latches include multiple components that cooperate with each other in order to provide operation of the vehicle door latch. In some applications, the latches are electrically opened with a motor operably coupled to the latch. In these applications, a second motor is typically required to place the latch in a position so that is can be mechanically operated or opened in the event of a power loss to the latch.

As such, it is desirable to provide an improved vehicle door latch wherein the latch which can operate as desired while reducing the number of components required for operation of the latch.

BRIEF DESCRIPTION

Disclosed is a vehicle latch, including: a claw rotatably mounted to a pin; a pawl rotatably mounted to pin; a single motor for electrically releasing the claw of the latch and for electrically moving the latch into an emergency mode wherein the latch can be mechanically opened via a handle operably coupled to the latch.

In addition to one or more of the features described above, or as an alternative to any of the foregoing embodiments, the single motor drives a worm that meshingly engages a wheel rotatably mounted to the latch.

In addition to one or more of the features described above, or as an alternative to any of the foregoing embodiments, the worm meshingly engages a plurality of teeth located about a periphery of the wheel.

In addition to one or more of the features described above, or as an alternative to any of the foregoing embodiments, the wheel has a cam portion located on one side of the wheel and a driving feature located on an opposite side of the wheel.

In addition to one or more of the features described above, or as an alternative to any of the foregoing embodiments, the cam portion is configured to engage a release lever, the release lever being operably coupled the pawl such that movement of the release lever by the cam portion of the wheel will cause movement of the pawl and wherein the driving feature is configured to engage the block lever, the block lever being operably coupled to the claw via a door ajar cam such that movement of the claw will cause movement of the block lever.

In addition to one or more of the features described above, or as an alternative to any of the foregoing embodiments, an unlocking lever is rotatably mounted to the wheel and wherein the driving feature is configured to contact and rotate the unlocking lever as the wheel is rotated, wherein the unlocking lever is operably coupled to a lock link such that movement of the unlocking lever will cause movement of the lock link and wherein the latch further comprises an outside release lever operably coupled to a lever that is also operably coupled to the lock link such that movement of the lock link will cause movement of the lever from a first position where the lever is not operably coupled to the pawl and a second position where the lever is operably coupled to the pawl.

In addition to one or more of the features described above, or as an alternative to any of the foregoing embodiments, the outside handle is operably coupled to the outside release lever via a cable.

In addition to one or more of the features described above, or as an alternative to any of the foregoing embodiments, the outside handle is located on an outside surface of a vehicle door the latch is associated with.

In addition to one or more of the features described above, or as an alternative to any of the foregoing embodiments, the latch further includes an emergency lock knob, the emergency lock knob being operably coupled to the lock link such that rotation of the emergency lock knob will cause rotation of the lock link such that movement of the lock link will cause movement of the lever from the second position to the first position.

In addition to one or more of the features described above, or as an alternative to any of the foregoing embodiments, the single motor manipulates the wheel in clockwise and counter clockwise directions.

Disclosed is a method of opening a vehicle latch with a single motor, the method including the steps of: operating the single motor in a first direction for electrically releasing a claw of the latch and operating the single motor in a second direction for electrically moving the latch into an emergency mode wherein the latch can be mechanically opened via a handle operably coupled to the latch.

In addition to one or more of the features described above, or as an alternative to any of the foregoing embodiments, the single motor drives a worm that meshingly engages a wheel rotatably mounted to the latch.

In addition to one or more of the features described above, or as an alternative to any of the foregoing embodiments, the worm meshingly engages a plurality of teeth located about a periphery of the wheel.

In addition to one or more of the features described above, or as an alternative to any of the foregoing embodiments, the wheel has a cam portion located on one side of the wheel and a driving feature located on an opposite side of the wheel.

In addition to one or more of the features described above, or as an alternative to any of the foregoing embodiments, the cam portion is configured to engage a release lever, the release lever being operably coupled a pawl such that movement of the release lever by the cam portion of the wheel will cause movement of the pawl and wherein the driving feature is configured to engage the block lever, the block lever being operably coupled to the claw via a door ajar cam such that movement of the claw will cause movement of the block lever.

In addition to one or more of the features described above, or as an alternative to any of the foregoing embodiments, an unlocking lever is rotatably mounted to the wheel and wherein the driving feature is configured to contact and rotate the unlocking lever as the wheel is rotated, wherein the unlocking lever is operably coupled to a lock link such that movement of the unlocking lever will cause movement of the lock link and wherein the latch further comprises an outside release lever operably coupled to a lever that is also operably coupled to the lock link such that movement of the lock link will cause movement of the lever from a first position where the lever is not operably coupled to the pawl and a second position where the lever is operably coupled to the pawl.

In addition to one or more of the features described above, or as an alternative to any of the foregoing embodiments, the outside handle is operably coupled to the outside release lever via a cable.

In addition to one or more of the features described above, or as an alternative to any of the foregoing embodiments, the outside handle is located on an outside surface of a vehicle door the latch is associated with.

In addition to one or more of the features described above, or as an alternative to any of the foregoing embodiments, the latch further includes an emergency lock knob, the emergency lock knob being operably coupled to the lock link such that rotation of the emergency lock knob will cause rotation of the lock link such that movement of the lock link will cause movement of the lever from the second position to the first position.

In addition to one or more of the features described above, or as an alternative to any of the foregoing embodiments, the single motor manipulates the wheel in clockwise and counter clockwise directions.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The present disclosure is directed to a vehicle door latch or latch that provides electrical release of the vehicle door latch and re-engagement of a mechanical back up release from outside the vehicle with only one motor instead two motors. This is particularly useful in the event when the vehicle is involved in a crash and there is no power to operate the motor of the vehicle door latch.

In one non-limiting alternative embodiment, the vehicle door latch can be combined with a hidden handle that becomes visible and usable only from the outside of the vehicle after an accident where the handle can be used by the first "rescue" people arriving on the crash area.

In accordance with an embodiment of the present disclosure, the latch has at least three predefined positions (closed/primary position, partially open/secondary position or fully open).

In accordance with one embodiment of the present disclosure and when a claw of the latch is in an open position a temporary mechanical stop is provided for a release actuator when the release actuator is in a floating position that corresponds to a rest or home position of the release actuator.

From this "floating" position and when the latch is in a closed position, a release motor of the release actuator rotates in one direction to open the latch or in an opposite direction to engage the mechanical back up. When the door is opened via electric release, powering the motor again in an opposite direction, rearms the release actuator to either open again electrically the latch or engage the mechanical back up. When a claw of the latch is in an open position the latch will prevent the release actuator to reach a position corresponding to engagement of the mechanical backup.

Referring now to FIGS. 1-15B, various aspects of the present disclosure will be discussed.

Figure 1:
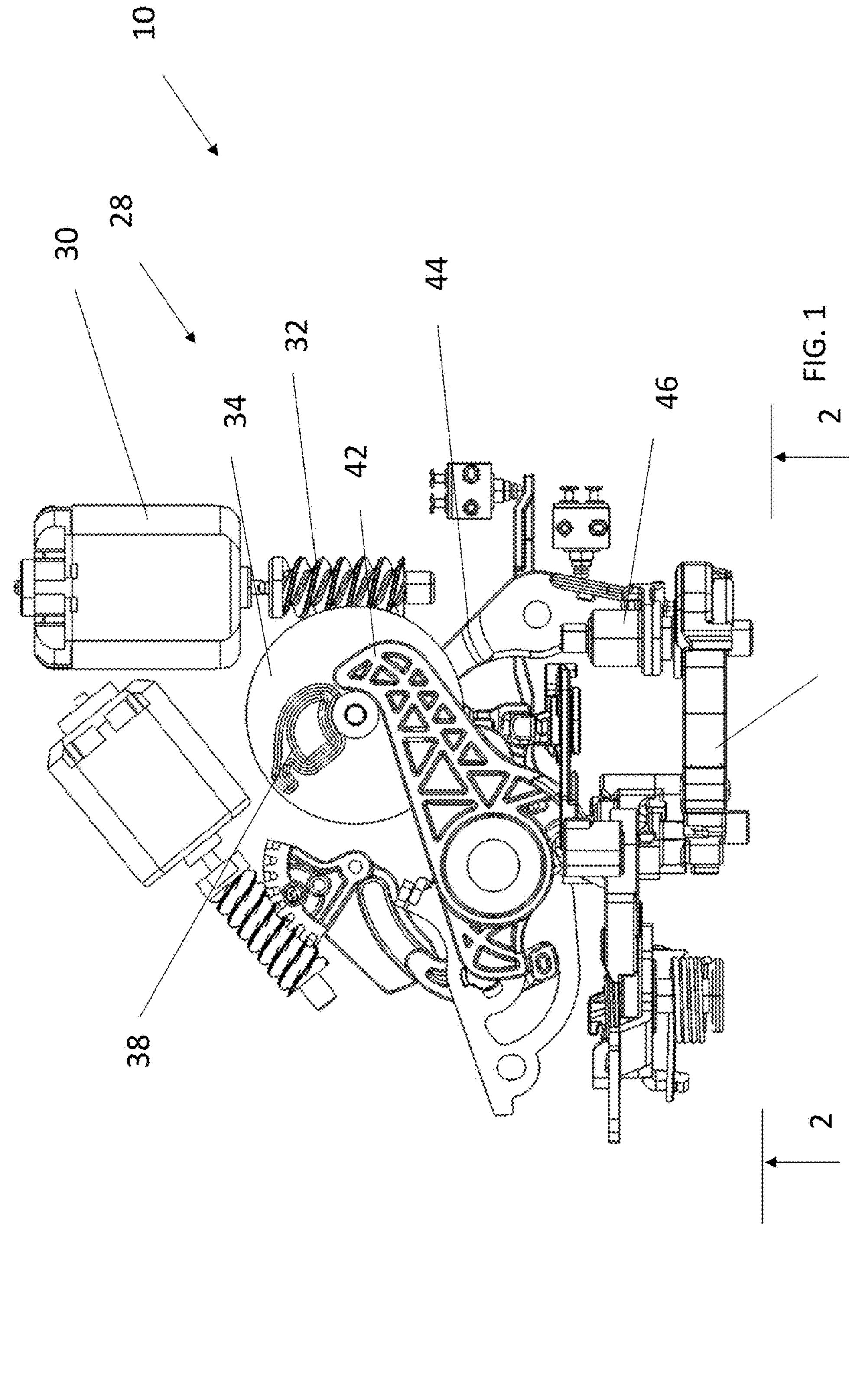
FIG. 1 illustrates portions of a vehicle latch in a door closed position or normal condition in accordance with an embodiment of the present disclosure.

FIG. 1 illustrates portions of a vehicle door latch or latch 10 in a door closed position or normal condition in accordance with an embodiment of the present disclosure. The vehicle door latch or latch 10 has a retention plate 11 (see FIGS. 15A and 15B), a housing 15 (see FIGS. 15A and 15B). The retention plate 11 is secured to the housing 15 and a release actuator described below will be secured to the housing 15.

The latch 10 also has a claw 20 and a pawl 22 each being pivotally mounted to the retention plate or other portions of the latch 10. The claw 20 is capable of rotation about a first stud or pin 24 and the claw is configured to engage and retain a striker (not shown) when it is received in the latch 10. The pawl 22 is a capable of rotation about a second stud or pin 26.

The claw 20 is capable of movement between a first or latched position or closed position or primary position (see at least FIG. 2) wherein the striker is engaged by a throat of the claw 20 and a second or open position wherein the striker is free to be released from the throat of the claw 20. In one non-limiting embodiment, the retention plate will also have a complimentary opening for receipt of the striker therein when it is engaged or latched by the claw 20. In one embodiment, the claw 20 may be spring biased into the second or open position by a spring or biasing member.

Alternatively or in addition to the spring biasing force applied to the claw 20, a movable member (e.g., door, panel, lift gate, etc.) the latch 10 is secured to may also be spring biased or biased into an open position such that when the latch 10 is released claw 20 will rotate and release striker. One non-limiting example of an item providing such a force is the compressed weather stripping or sealing member located around the periphery of an opening that is covered by the movable member. In other words, when a vehicle door or other movable member is closed, the sealing member is compressed and the latch 10 engages the striker. Thereafter and when the latch 10 is released, the sealing member may provide an urging force to open the door or gate, etc.

During operation and in order to retain the latch 10 or claw 20 in the latched position, the pawl 26 is pivotally secured to the latch 10 for movement between an engaged position or latched position and a disengaged position or released position. When the pawl 26 is in the engaged position, a surface of the claw 20 is engaged by a surface of the pawl 26 and the claw 20 is prevented from moving toward the unlatched position from the latched position.

In one non-limiting implementation, a first spring may be provided for biasing the claw 20 into the open position while a second spring may be provided for biasing the pawl 26 in the direction of the engaged position, such that movement of the claw to the latched position will cause the pawl to move to the engaged position.

Figure 2:
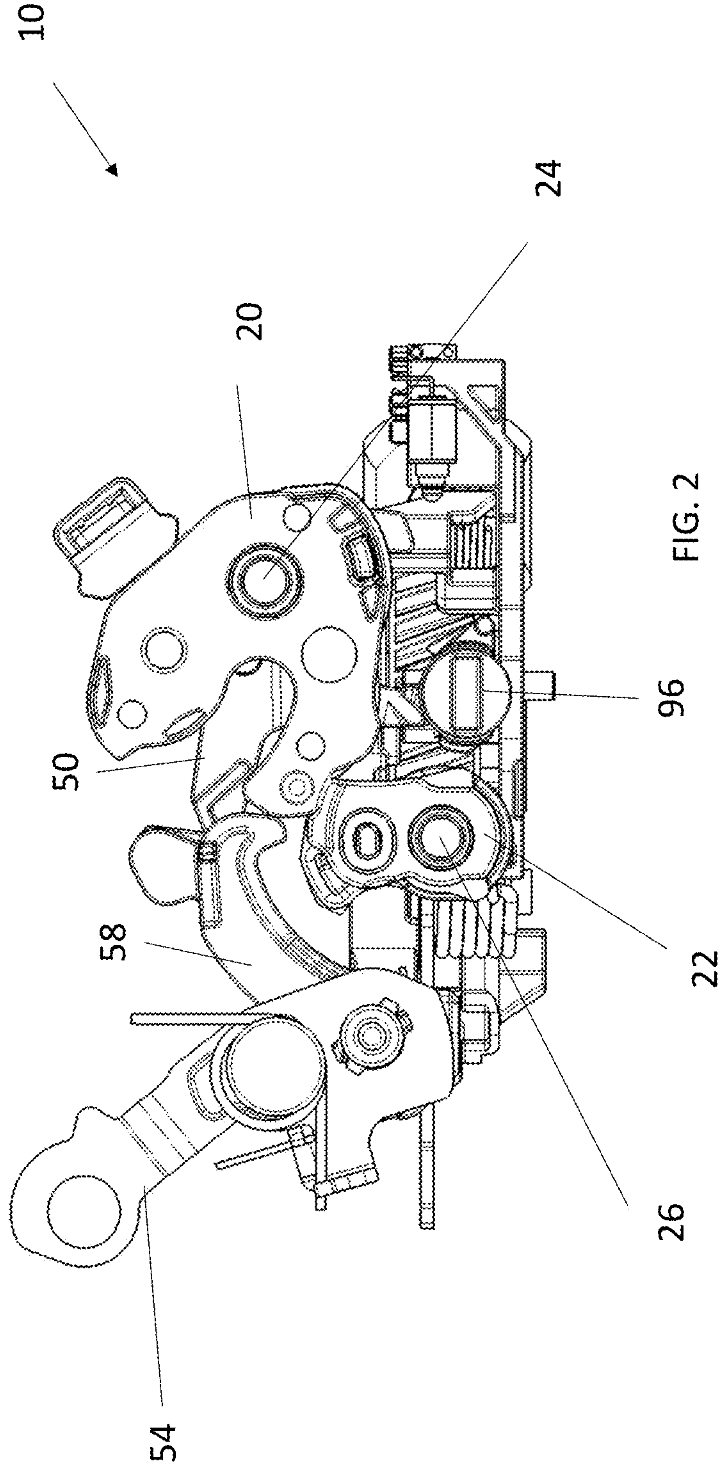
FIG. 2 is a view along lines 2-2 of FIG. 1.
Figure 3:
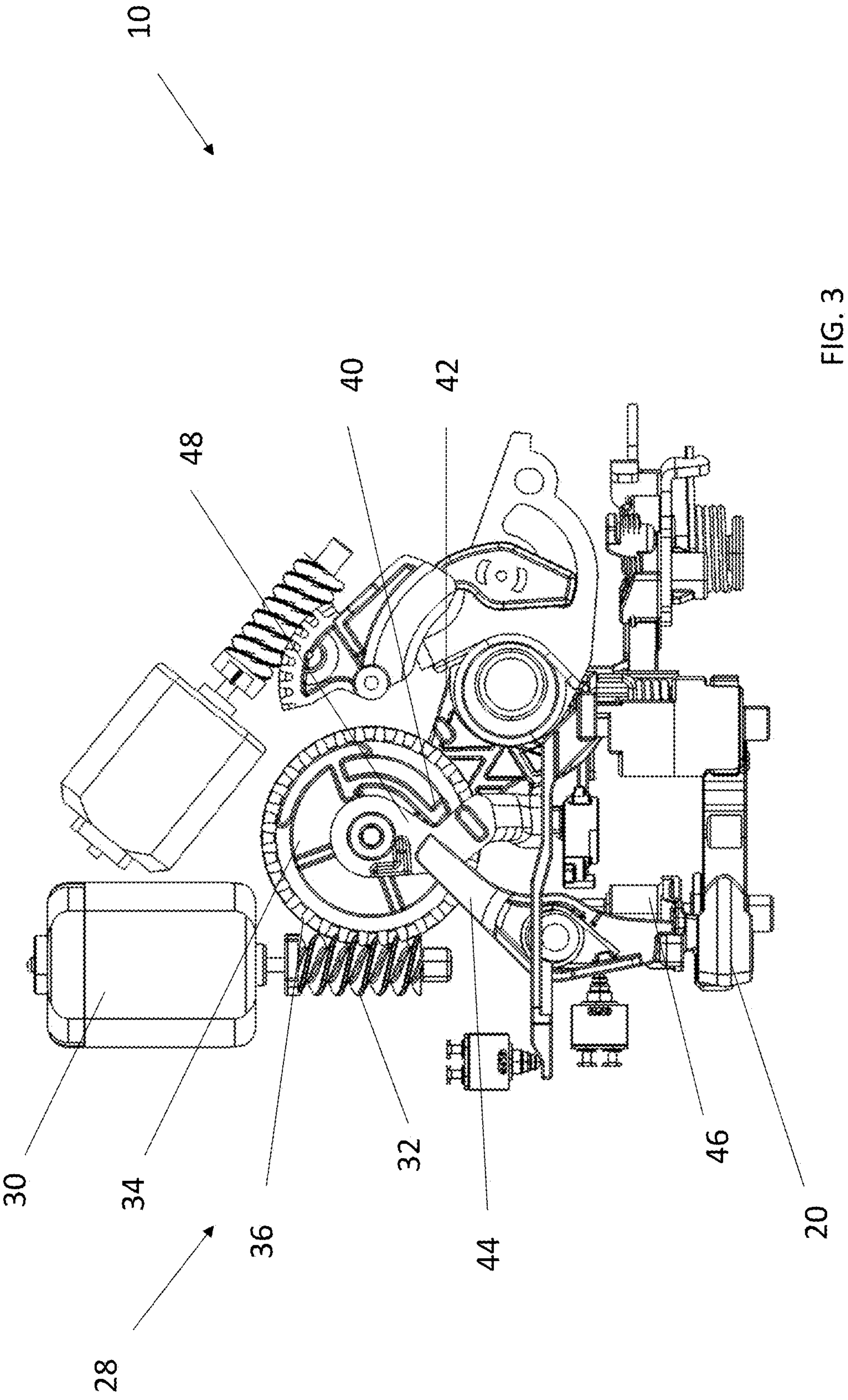
FIG. 3 illustrates portions of a vehicle latch in a normal door closed position in accordance with an embodiment of the present disclosure, the view in FIG. 3 is an opposite side view with respect to FIG. 1.
Figure 3A:
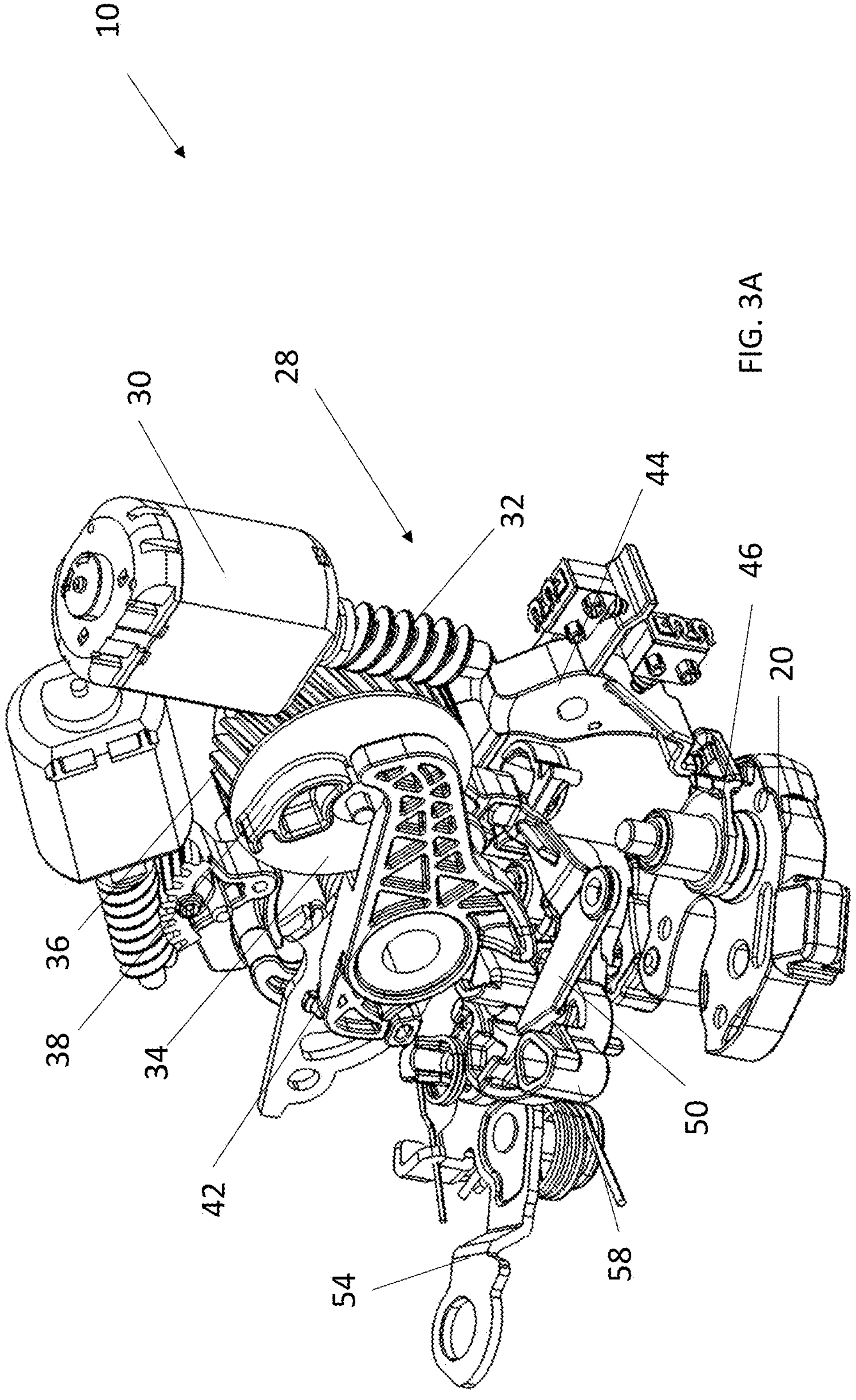
FIGS. 3A and 3B are perspective views of the vehicle latch illustrated in FIG. 3.
Figure 3B:
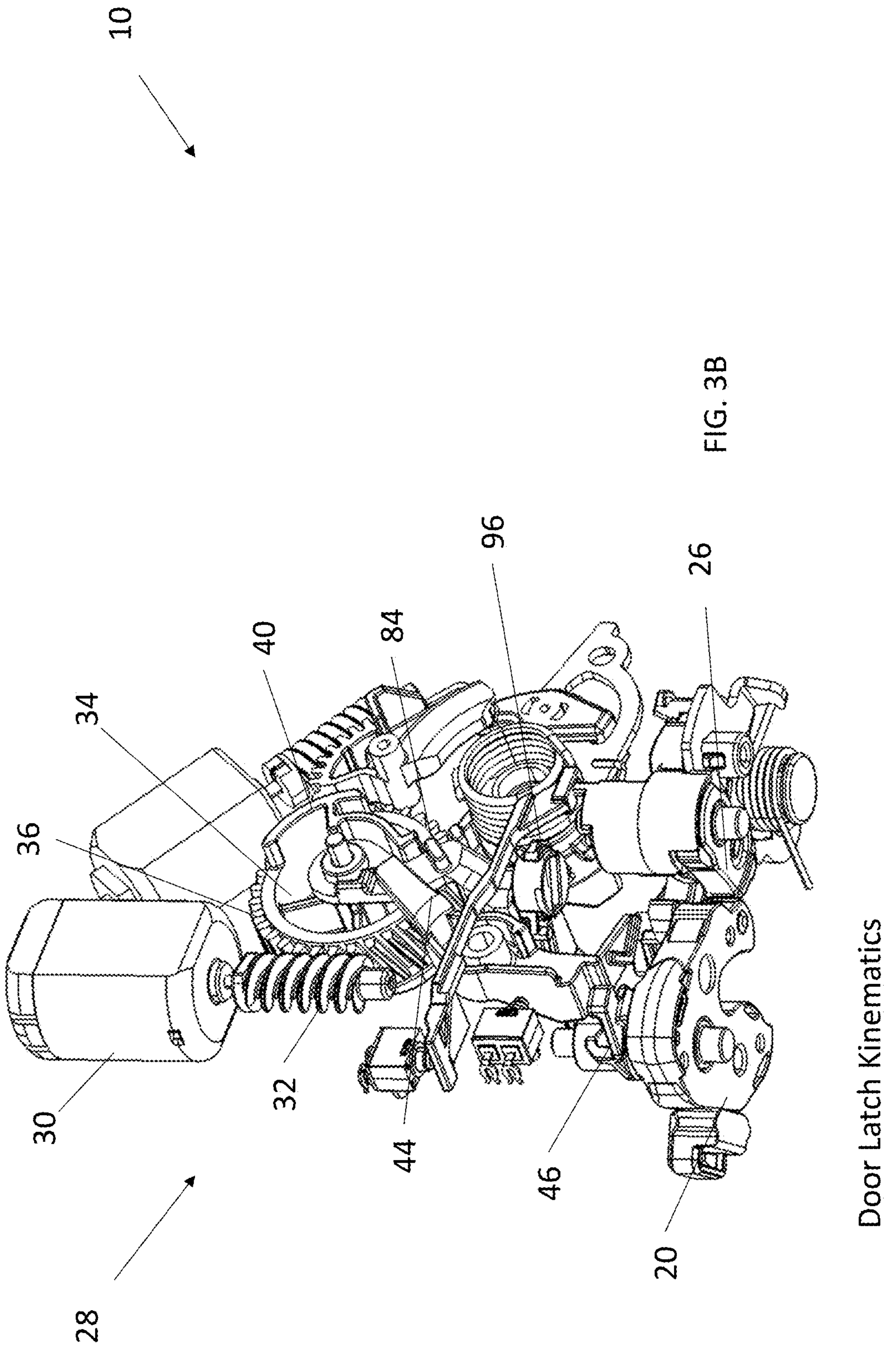

FIG. 2 is a view along lines 2-2 of FIG. 1 and FIGS. 3, 3A and 3B illustrates portions of the vehicle door latch 10 in a normal door closed position in accordance with an embodiment of the present disclosure, the view in FIG. 3 being an opposite side view with respect to FIG. 1. FIG. 2 illustrates the latch 10 is a door closed normal condition—retention engaged, ready for electric release and emergency back up disengaged. FIG. 3 illustrates the latch 10 is a door closed normal condition—stops control side of the wheel 34. FIGS. 3A and 3B illustrate the latch 10 kinematics.

The latch 10 also includes a release actuator 28. The release actuator 28 is used for electrically releasing the latch 10 when it is in the closed/primary position so that it may travel from the closed/primary position to a partially open/secondary position and a fully open position. The release actuator 28 is also used for electrically moving the latch 10 into an emergency mode wherein the latch 10 can be mechanically opened via a handle operably coupled to the latch 10 when it is in the closed/primary position so that it may travel to a partially open/secondary position and a fully open position from the closed/primary position The release actuator 28 includes a first motor 30 for driving a worm 32 that meshingly engages a wheel 34 rotatably mounted to the latch 10. The worm 32 meshingly engages a plurality of teeth 36 located about a periphery of the wheel 34. The wheel 34 also has a cam portion 38 located on one side of the wheel 34 and a driving feature 40 located on an opposite side of the wheel 34. The view in FIG. 1 illustrates a release side of the wheel 34.

The cam portion 38 is configured for engaging a release lever 42 while the driving feature 40 is configured to engage a block lever 44. Both the release lever 42 and the block lever 44 are rotatably mounted to the latch 10. The release lever 42 is operably coupled the pawl 26 such that movement of the release lever 42 by the cam portion 38 of the wheel 34 will cause movement of the pawl 26. The block lever 44 is operably coupled to the claw 20 via a door ajar cam 46 such that movement of the claw will cause movement of the block lever 44.

An unlocking lever 48 is rotatably mounted to the wheel 34. The driving feature 40 is also configured to contact and rotate the unlocking lever 48 during certain operations of the latch 10 as will be described below. The unlocking lever 48 is operably coupled to a lock link 50 such that movement of the unlocking lever 48 will cause movement of the lock link 50 which will in turn operably couple the pawl 26 to an outside handle 52 (illustrated schematically) such that movement of the outside handle 52 when the latch 10 is in the emergency mode, operation of the outside handle 52 will cause movement of the pawl 26 so the latch 10 can be opened. In one non-limiting embodiment, the outside handle 52 is located on an outside surface of a vehicle door the latch 10 is associated with. In yet one other alternative non-limiting alternative embodiment, the vehicle door latch 10 can be combined with a hidden handle 52 that becomes visible and usable only from the outside of the vehicle after an accident where the handle 52 can be used by the first "rescue" people arriving on the crash area.

In one non-limiting embodiment, the outside handle 52 is operably coupled to an outside release lever 54 via a cable 56. In one non-limiting embodiment, the outside release lever 54 is operably coupled to a lever 58 that is also operably coupled to the lock link 50 such that movement of the lock link 50 will cause movement of the lever 58 from a first position (see at least FIGS. 5A-5C and 12B) where the lever 58 is not operably coupled to the pawl 26 and a second position where the lever 58 is operably coupled to the pawl 26 (see at least FIGS. 11A-11D and 12A).

Figure 4:
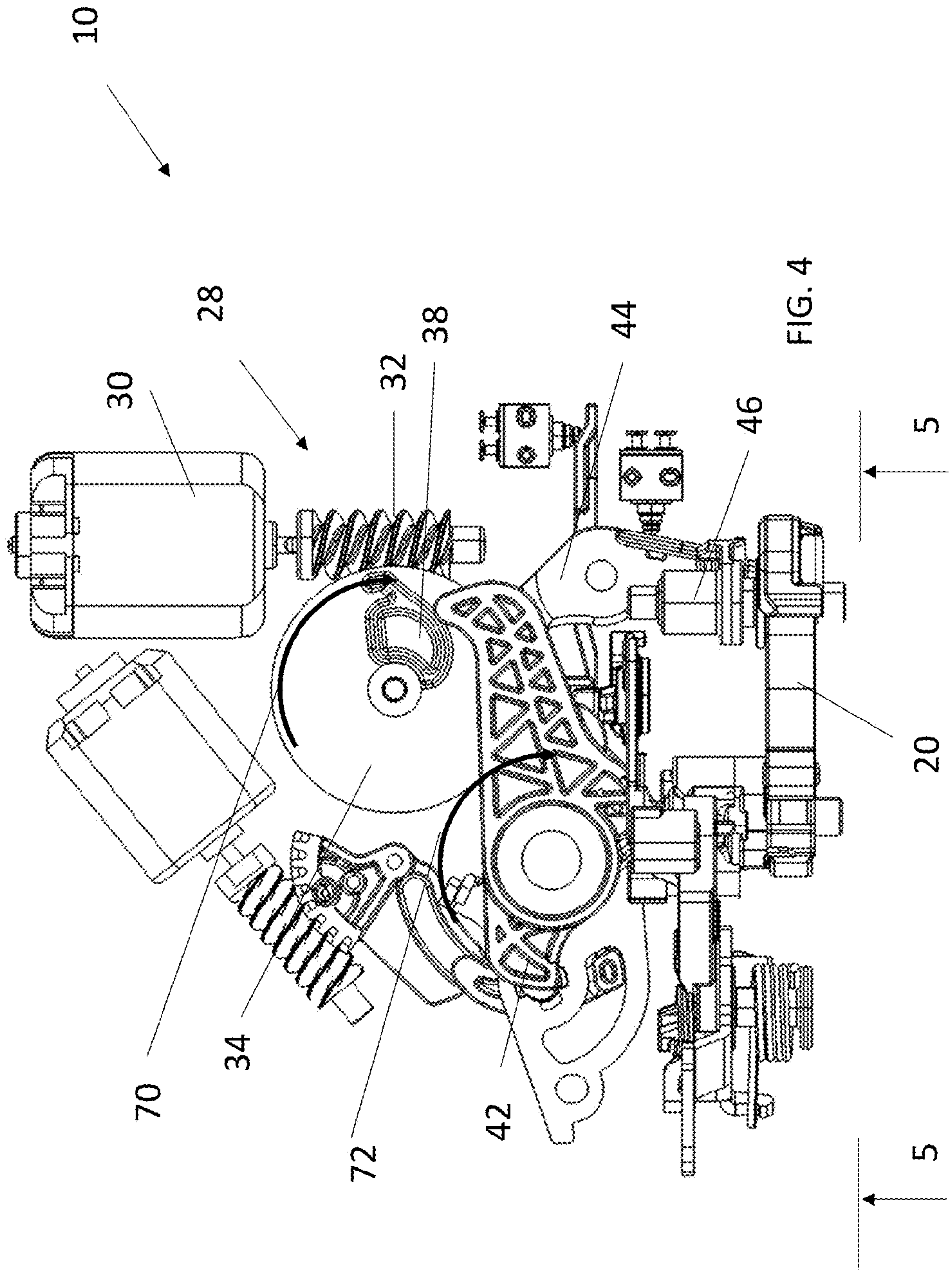
FIG. 4 illustrates portions of a vehicle latch during electric release of the latch from the closed position illustrated in FIGS. 1-3, in accordance with an embodiment of the present disclosure.
Figure 5A:
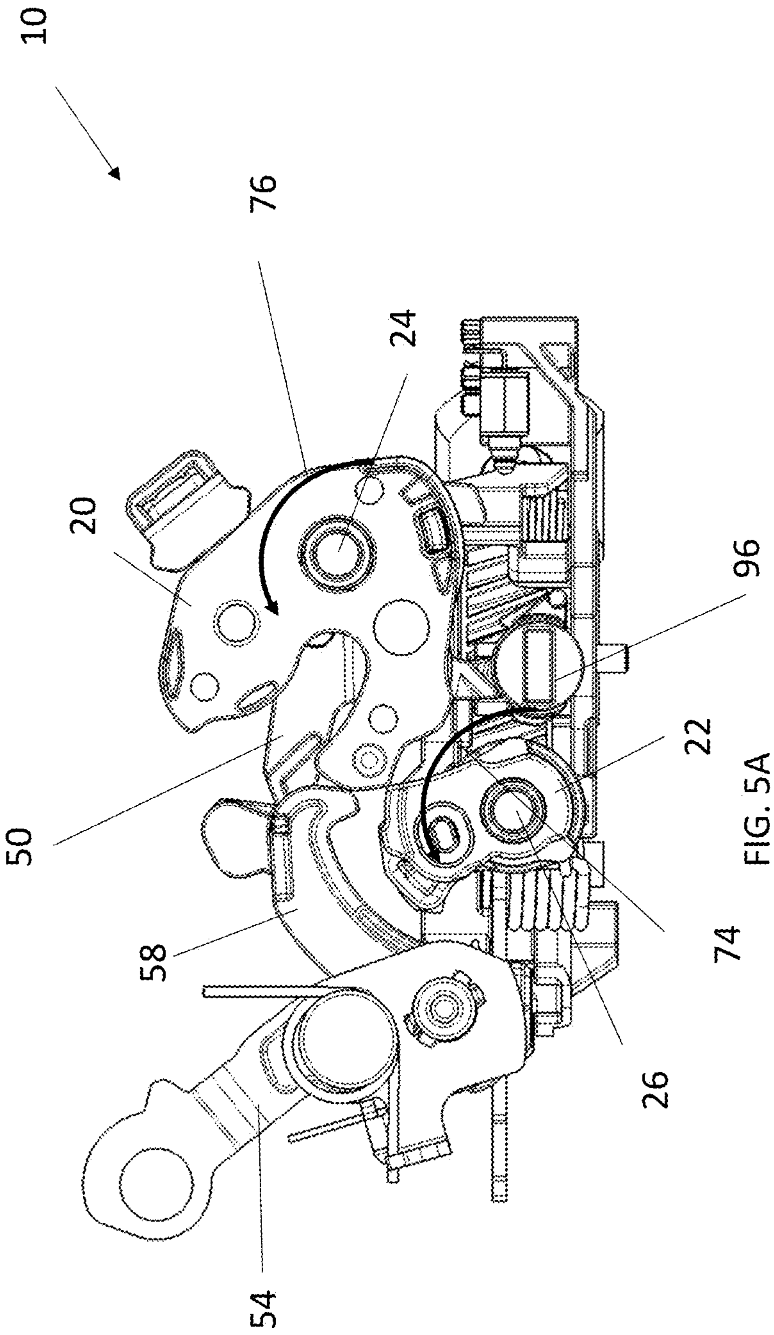
FIGS. 5A-5C are views along lines 5-5 of FIG. 4 illustrating the electric release of the latch from the closed position illustrated in FIGS. 1-3, in accordance with an embodiment of the present disclosure.
Figure 5B:
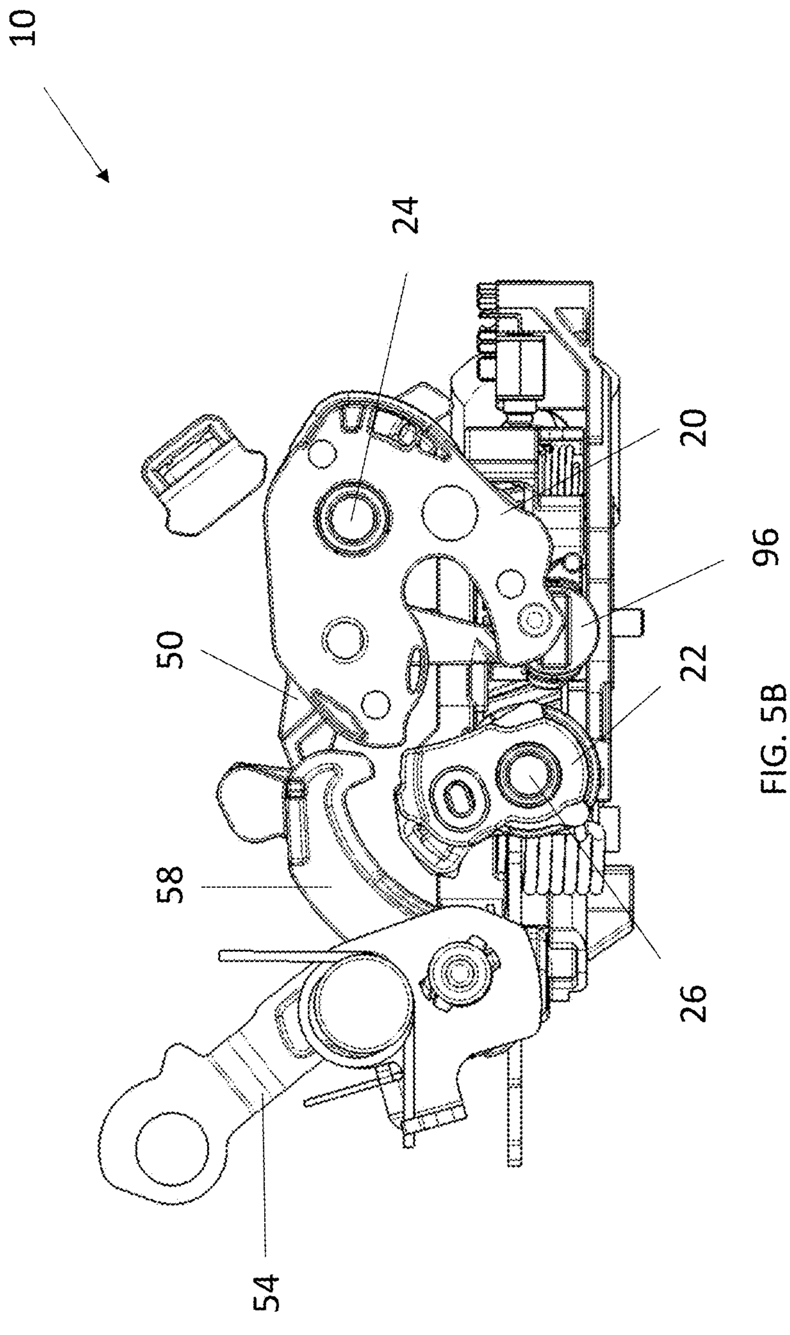
Figure 5C:
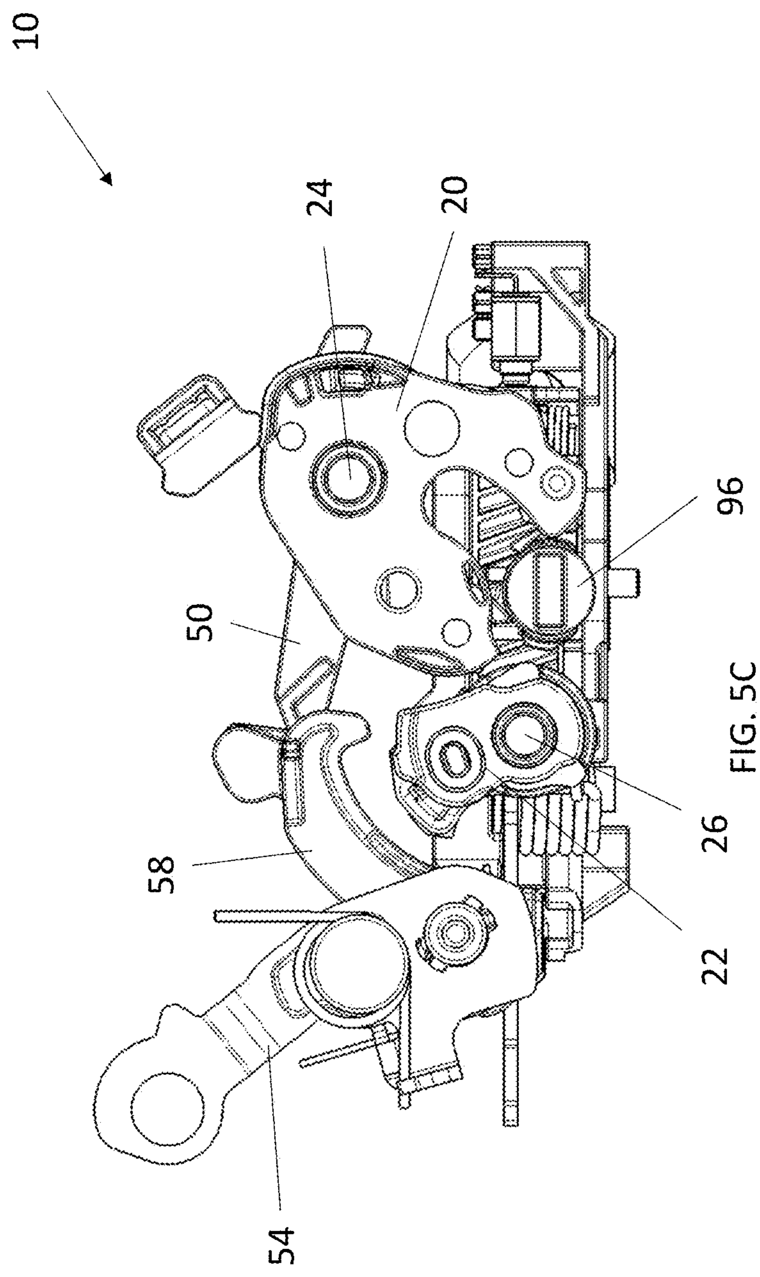

FIG. 4 illustrates portions of the vehicle latch 10 during electric release of the latch 10 from the closed position illustrated in FIGS. 1-3. FIGS. 5A-5C are views along lines 5-5 of FIG. 4 illustrating the electric release of the latch from the closed position illustrated in FIGS. 1-3. During the electric release of the latch 10 from the closed position the motor 30 is activated by for example a controller operably coupled to the motor 30. Upon activation of the motor 30 the worm 32 is driven and the wheel 34 rotates in the direction of arrow 70. During this rotation, the cam portion 38 contacts the release lever 42 causing it to move in the direction of arrow 72 this movement also causes rotational movement of the pawl 26 in the direction of arrow 74, which will allow the claw 20 to rotate in the direction of arrow 76 thus reaching the position in FIG. 5C. FIG. 4 illustrates electric release of the latch 10 (actuator view, with wheel 34 turning clock wise). FIG. 5A illustrates electric release of the latch 10—(retention view (claw in closed position, pawl disengaged from the claw)). FIG. 5B illustrates electric release of the latch 10—(retention view (claw in secondary position, pawl disengaged from the claw)). FIG. 5C illustrates electric release of the latch—(retention view (claw in open position, pawl still disengaged from the claw)).

Figure 6:
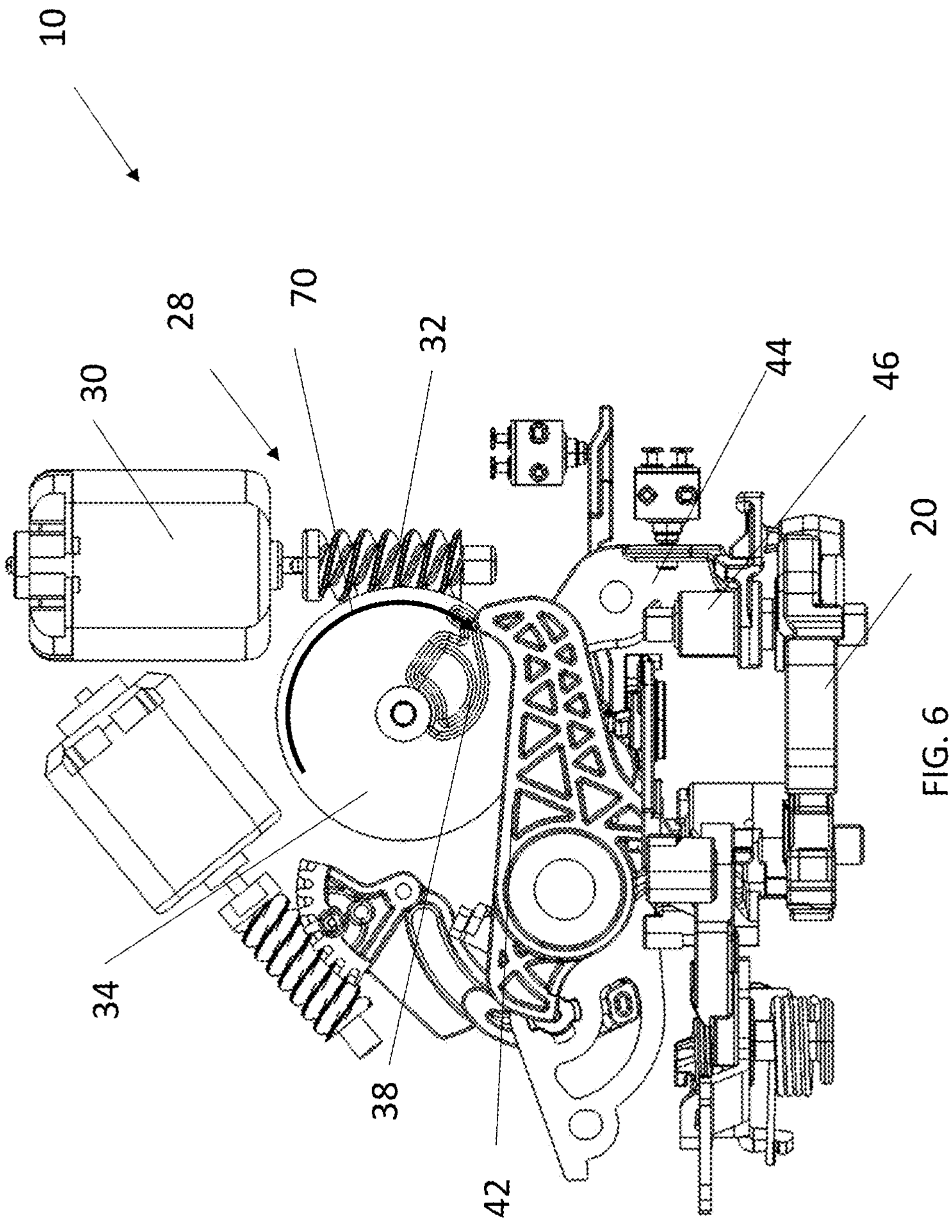
FIG. 6 illustrates portions of a vehicle latch after full electric release of the latch from the closed position illustrated in FIGS. 1-3 in accordance with an embodiment of the present disclosure.
Figure 6B:
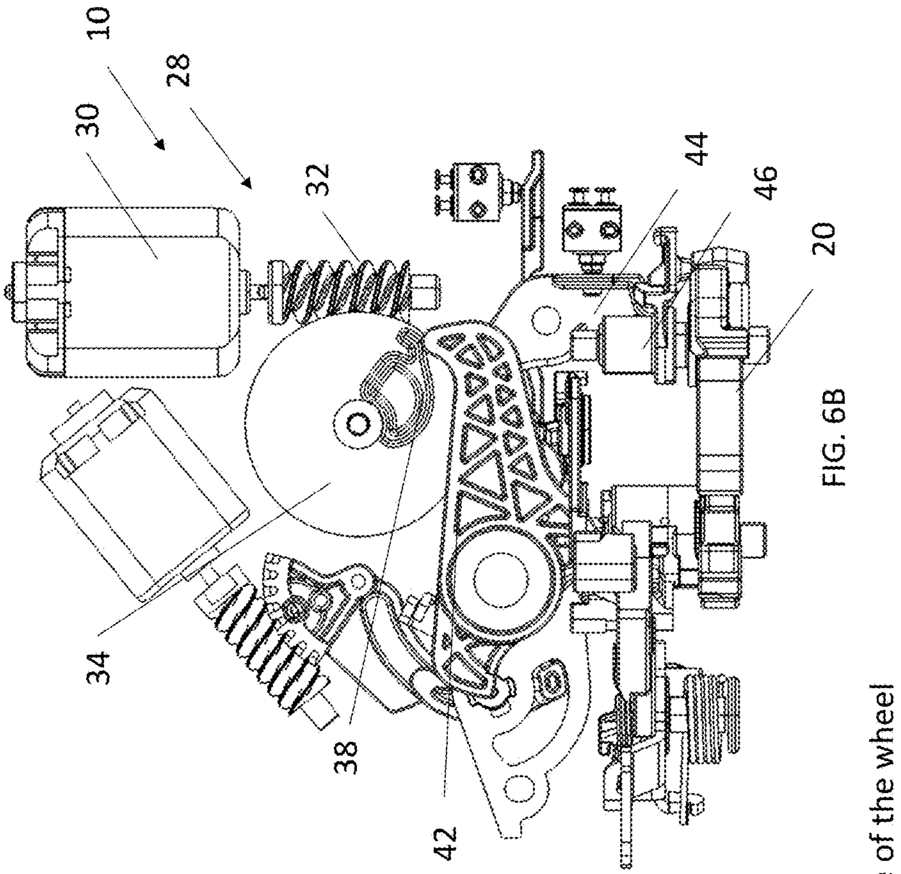
FIGS. 6A and 6B illustrate electric release of the latch in accordance with an embodiment of the present disclosure.
Figure 6A:
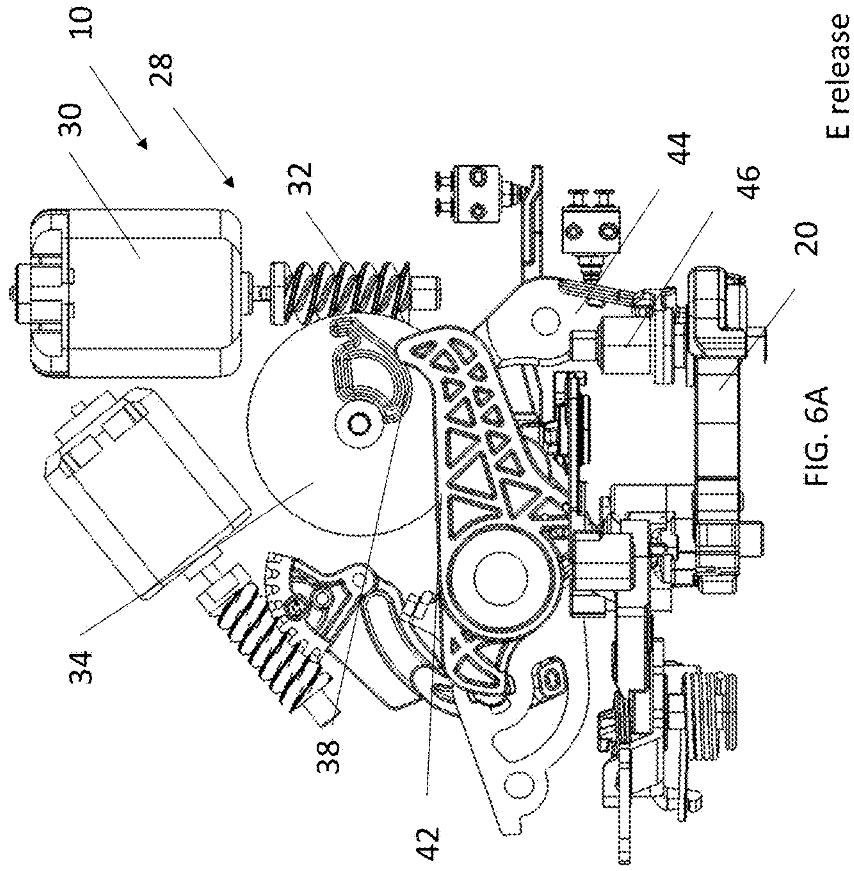

FIG. 6 illustrates portions of the vehicle latch 10 after full electric release of the latch 10 from the closed position illustrated in FIGS. 1-3. In FIG. 6, electric release (full travel) of the latch 10 is illustrated where the wheel 34 is driven in a clockwise direction, but on a stop. FIGS. 6A and 6B illustrate electric release of the latch 10.

Figure 7:
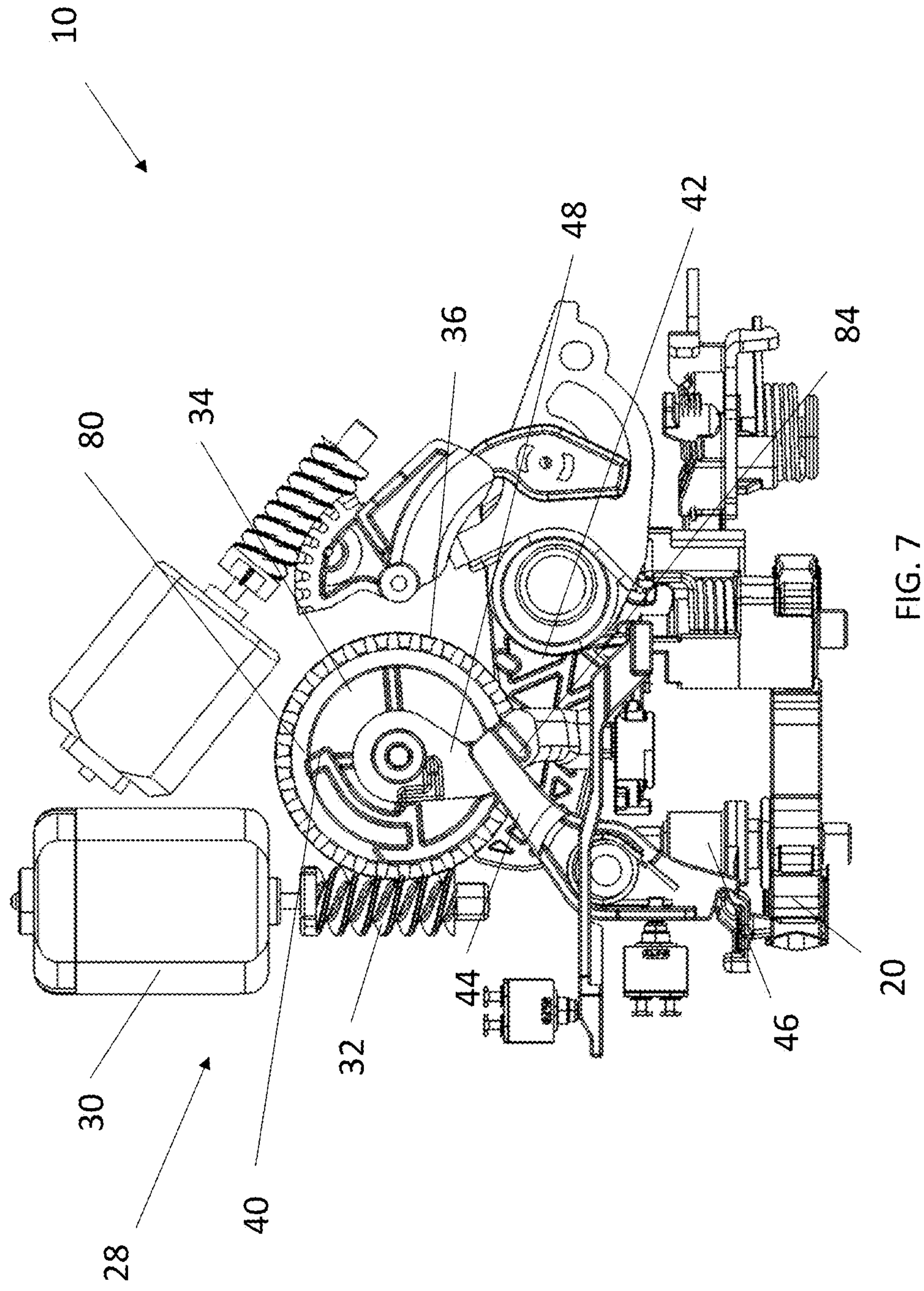
FIG. 7 illustrates portions of a vehicle latch after full electric release of the latch from the closed position illustrated in FIGS. 1-3, in accordance with an embodiment of the present disclosure, the view in FIG. 7 is an opposite side view with respect to FIG. 6.
Figure 7B:
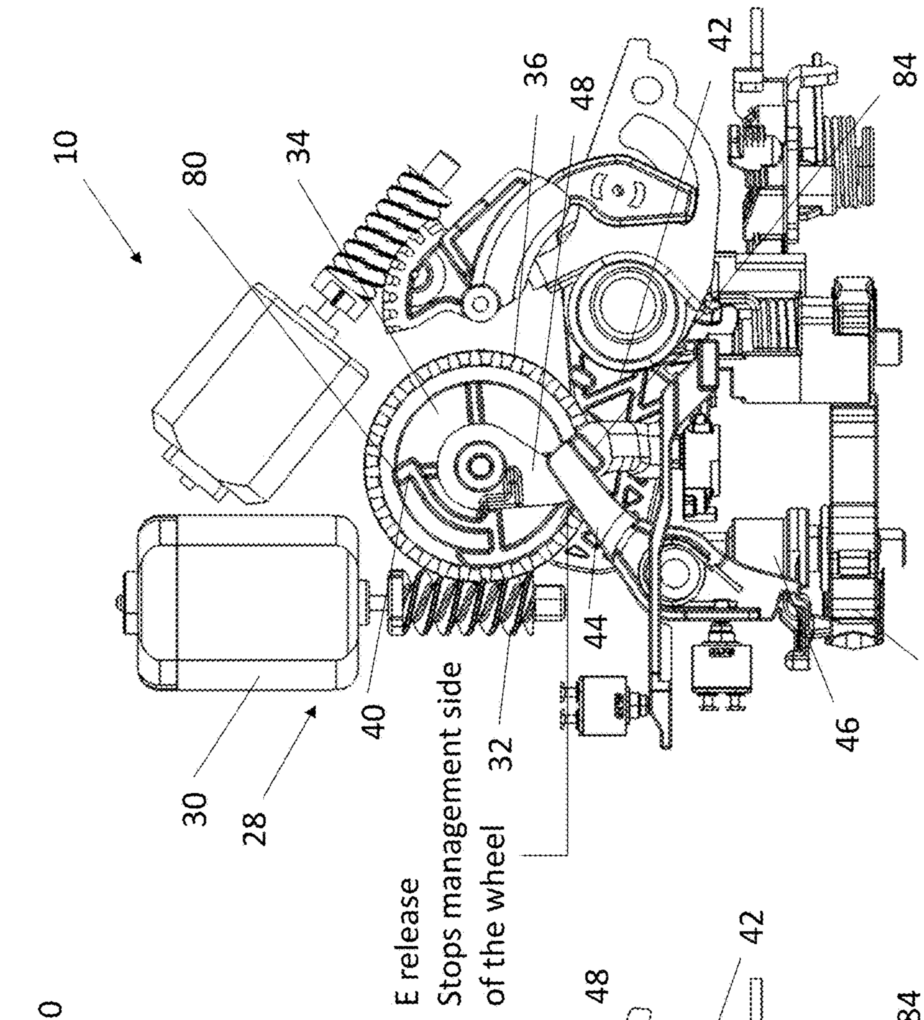
FIGS. 7A and 7B illustrate electric release of the latch.
Figure 7A:
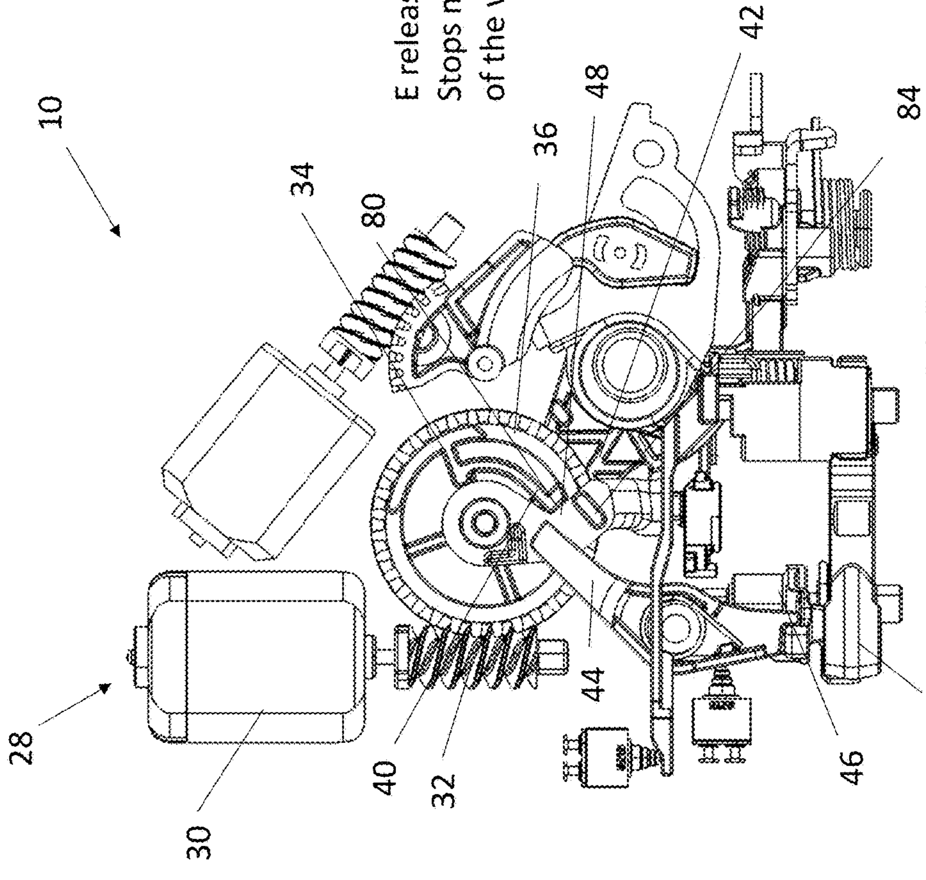

FIG. 7 illustrates portions of the vehicle latch 10 after full electric release of the latch 10 from the closed position illustrated in FIGS. 1-3, the view in FIG. 7 being an opposite side view with respect to FIG. 6. FIG. 7 illustrates electric release (full travel) of the latch where the wheel 34 is driven in a clockwise direction on its stop. FIGS. 7A and 7B illustrate electric release of the latch 10 and in FIG. 7B the stops on the management side of the wheel 34.

Figure 8:
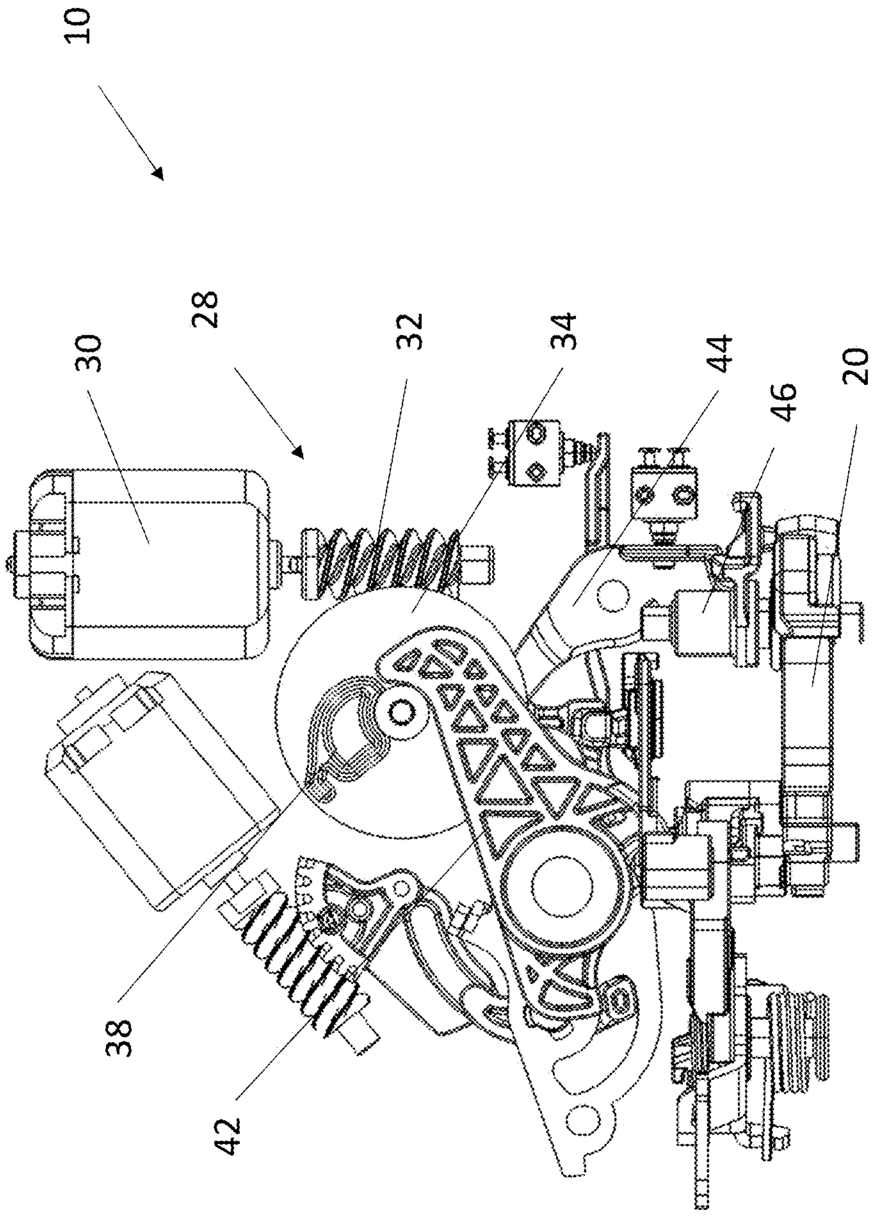
FIG. 8 illustrates portions of a vehicle latch after electric release of the latch from the closed position illustrated in FIGS. 1-3, wherein the latch is in a door open condition and a motor of the latch has returned a wheel of the latch to a rest position or the position illustrated in at least FIG. 1 in accordance with an embodiment of the present disclosure.

FIG. 8 illustrates portions of the vehicle latch 10 after electric release of the latch 10 from the closed position illustrated in FIGS. 1-3, wherein the latch 10 is in a door open condition and the motor 30 of the latch 10 has returned the wheel 34 of the latch 10 to a rest position or the position illustrated in at least FIG. 1. The rotation of wheel 34 back to the rest position is caused by rotating the wheel 34 in a direction opposite to arrow 70. FIG. 8 illustrates the latch 10 from a driving side of the wheel 34 where the wheel 34 is returned to a rest position and the door the vehicle is opened.

Figure 9:
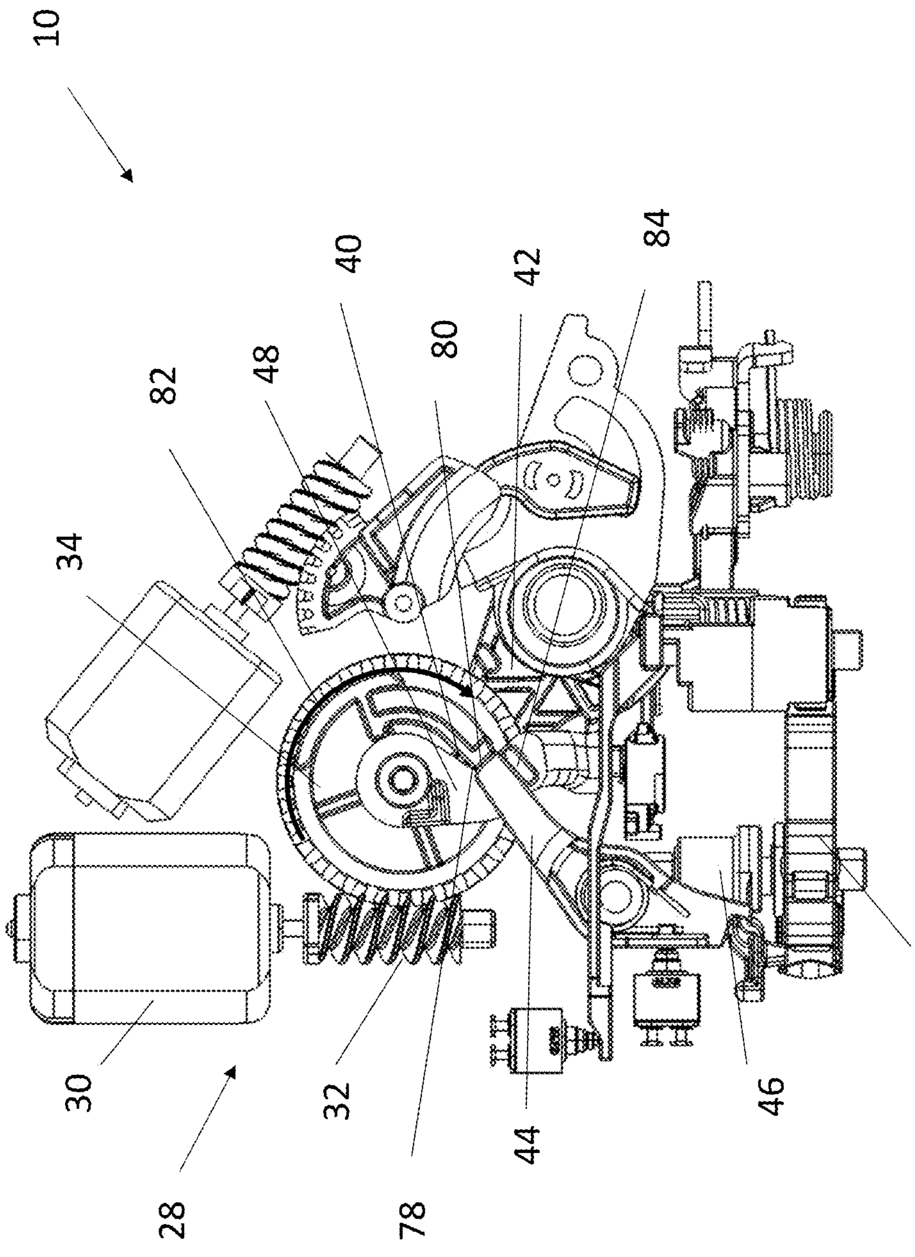
FIG. 9 illustrates portions of a vehicle latch after electric release of the latch from the closed position illustrated in FIGS. 1-3, wherein the latch is in a door open condition and a motor of the latch has returned a wheel of the latch to a rest position or the position illustrated in at least FIG. 1 in accordance with an embodiment of the present disclosure, the view in FIG. 9 is an opposite side view with respect to FIG. 8.

FIG. 9 illustrates portions of the vehicle latch 10 after electric release of the latch 10 from the closed position illustrated in FIGS. 1-3, wherein the latch 10 is in a door open condition and the motor 30 of the latch 10 has returned the wheel 34 of the latch 10 to the rest position or the position illustrated in at least FIG. 1. In accordance with an embodiment of the present disclosure, the view in FIG. 9 is an opposite side view with respect to FIG. 8. Since the latch 10 is in a door open condition the block lever 44 is in a position corresponding to the claw 20 being in an open position. At this point, a distal end 78 of the block lever 44 contacts an end 80 of driving feature 40 such that further rotation of the wheel 34 in the direction of arrow 82 is prevented. Also shown in FIG. 9 is that the unlocking lever 48 has a rib or portion 84 that is configured to contact a portion of block lever 44. FIG. 9 illustrates the wheel 34 returned to a rest position when the door of the vehicle is opened and the stops on the control side of the wheel 34.

Figure 10B:
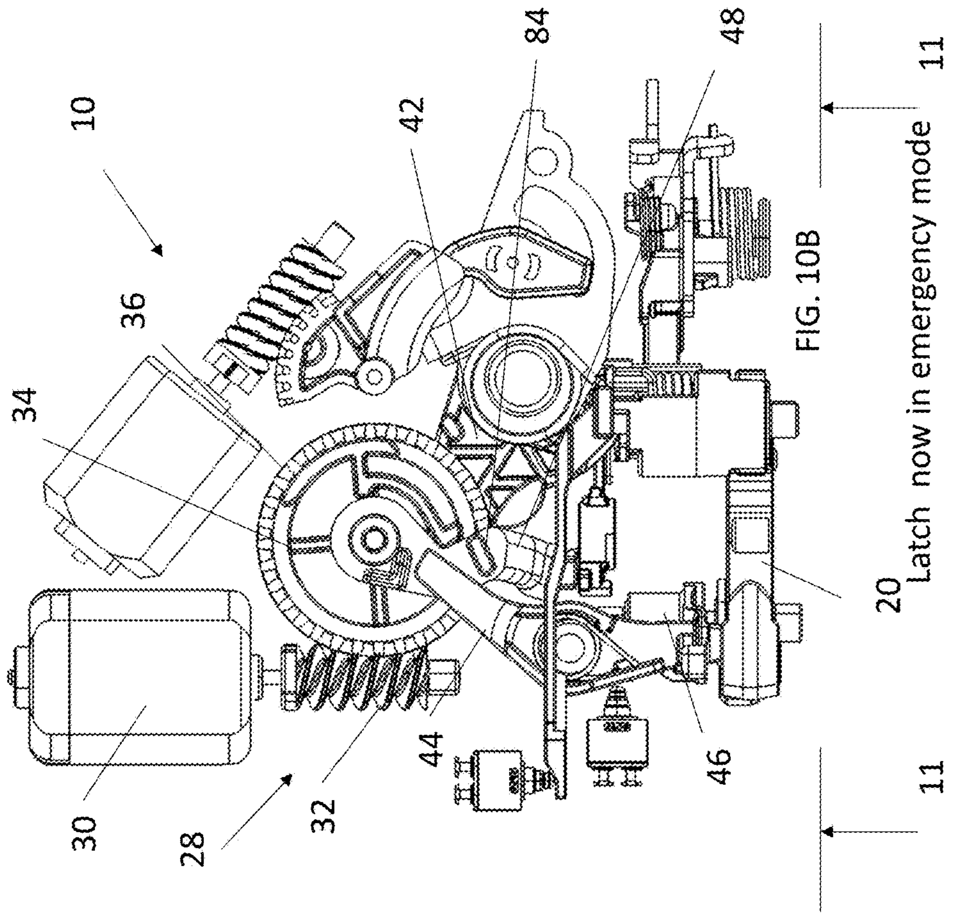
FIG. 10B illustrates portions of a vehicle latch where a motor of the vehicle latch has moved a wheel of vehicle latch into an emergency mode where the vehicle latch has been into an emergency mode where the vehicle latch can be mechanically opened by a handle operably coupled to the vehicle latch in accordance with an embodiment of the present disclosure.
Figure 10A:
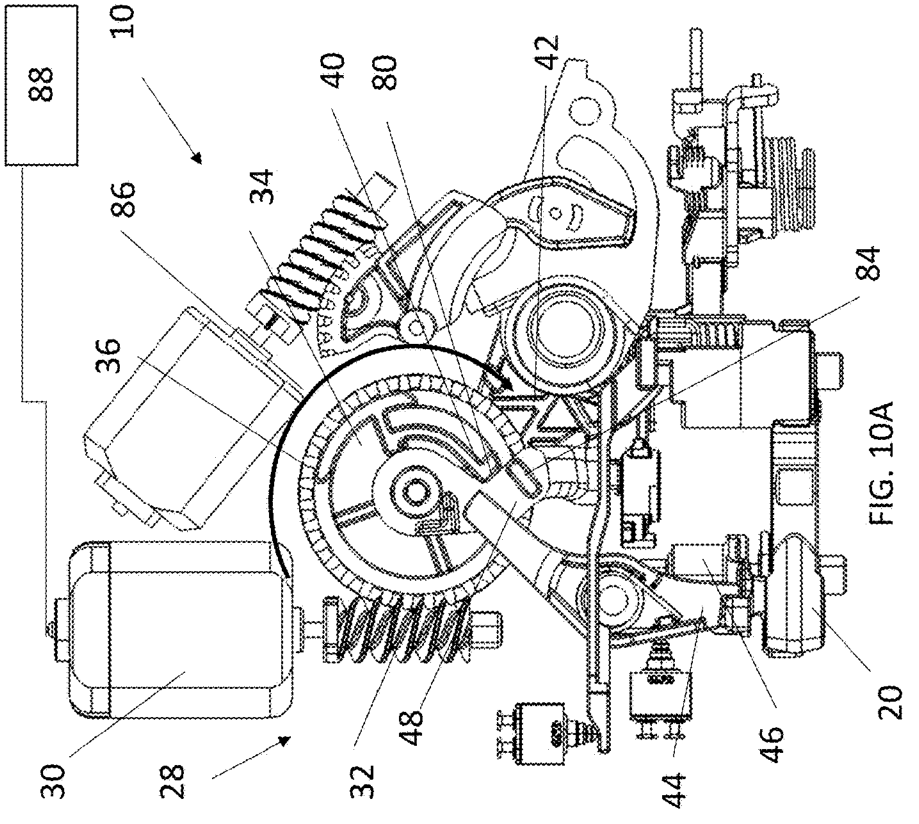
FIG. 10A illustrates portions of a vehicle latch in a door closed position or normal condition in accordance with an embodiment of the present disclosure.

FIG. 10A illustrates portions of the vehicle latch 10 in a door closed position or normal condition in accordance with an embodiment of the present disclosure. FIG. 10A is view similar to that of FIG. 3. In this position, the block lever 44 is no longer in contact with the driving feature 40. As such and when the wheel 34 is rotated in the direction of arrow 86 from the position illustrated in FIG. 10A. The end 80 of the driving feature 40 will contact the unlocking lever 48 and cause a portion of the unlocking lever 48 to rotate in the direction arrow 86 as well. Since the unlocking lever 48 is operably coupled to the lock link 50 movement of the unlocking lever 48 in the direction of arrow 86 will cause movement of the lock link 50 that will cause lever 58 to move from a first position (see at least FIGS. 5A-5C and 12B) where the lever 58 is not operably coupled to the pawl 26 and a second position where the lever 58 is operably coupled to the pawl 26 (see at least FIGS. 11A-11D and 12A). This may be referred to an "emergency mode". In this emergency mode the pawl 26 is operably coupled to an outside handle 52 (illustrated schematically) such that movement of the outside handle 52 when the latch is in the emergency mode operation of the outside handle 52 will cause movement of the pawl 26 so the latch 10 can be opened. In FIGS. 10A and 10B emergency backup for outside release is illustrated and FIG. 10B illustrates the latch 10 in the emergency mode.

In accordance with an embodiment of the present disclosure, the movement of the wheel 34 in the direction of arrow 86 will occur when a pre-determined condition is detected by a controller 88 operable coupled to the latch 10 or motor 30. The pre-determined condition may be referred to conditions detected prior to a vehicle crash where the latch 10 may lose its connection to a power source such as a battery. Sensing the pre-determined condition may be similar to those detected that will cause activation of a vehicle airbag (e.g., massive decelerations detected by an accelerometer or other equivalent sensor). Alternatively or in addition to an accelerometer, a sensor may be located in the door the vehicle latch 10 is located in and the sensor may be configured to detect deflections in the door, which may be due to an imminent crash.

As mentioned above and when the latch is in the emergency mode illustrated in at least FIG. 10B, the latch 10 can be opened via actuation of the outside handle 52 located on an outside surface of a vehicle door the latch 10 is associated with. In yet one other alternative non-limiting alternative embodiment, the vehicle door latch 10 can be combined with a hidden handle 52 that becomes visible and usable only from the outside of the vehicle after an accident where the handle 52 can be used by the first "rescue" people arriving on the crash area.

As mentioned above, the outside handle 52 is operably coupled to the outside release lever 54 via a cable 56 and the outside release lever 54 is operably coupled to the lever 58, which when moved to the second position is operably coupled to the pawl 26 such that the outside handle 52 can move the pawl 26 so that the latch 10 can be opened.

FIG. 10B illustrates portions of the vehicle latch 10 where the motor 30 of the vehicle latch 10 has moved the wheel 34 of vehicle latch 10 so that the latch 10 is now in the emergency mode where the vehicle latch 10 can be mechanically opened by the handle operably coupled to the vehicle latch 10 in accordance with an embodiment of the present disclosure.

Figures 11A, 11B, 11C, 11D:
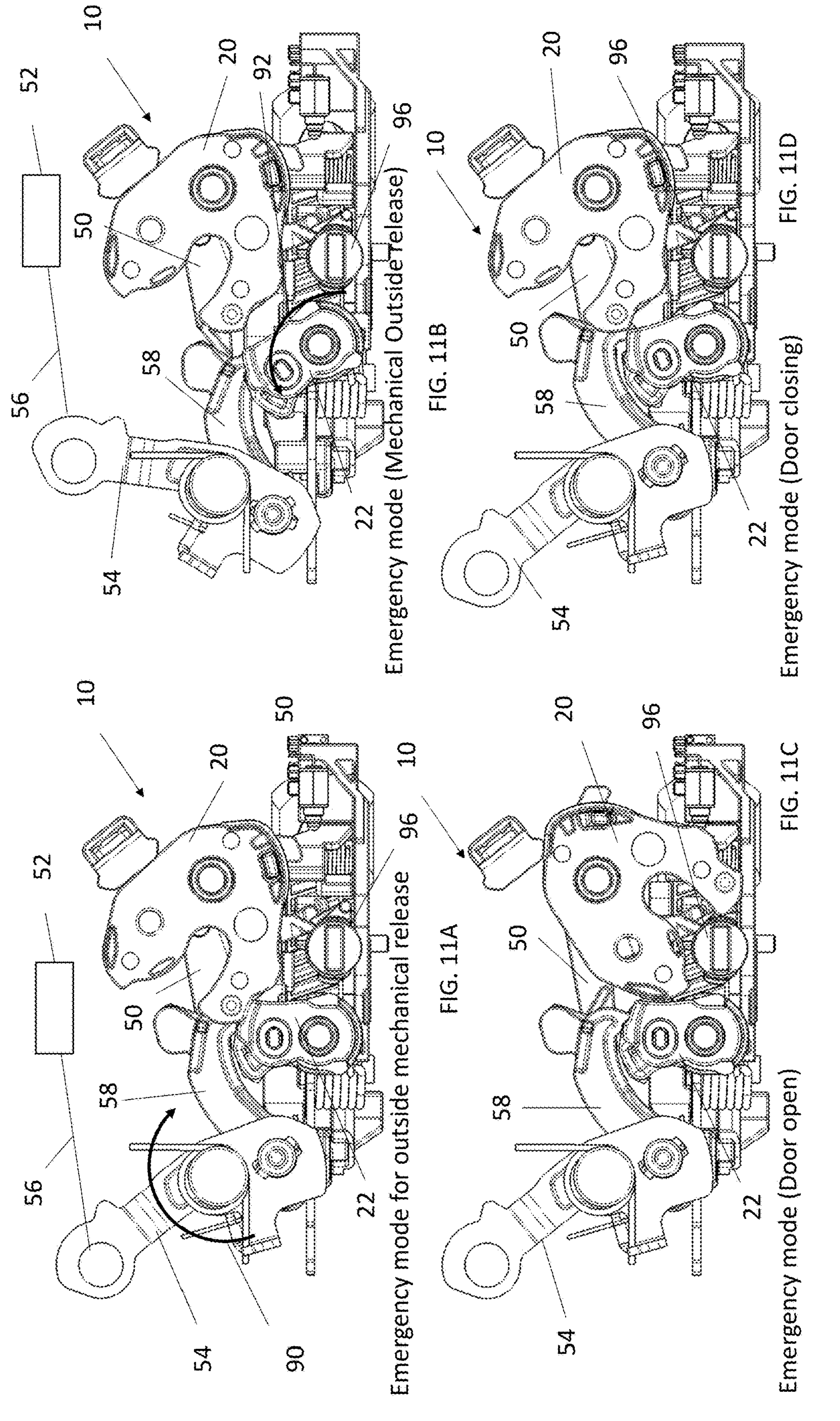
FIGS. 11A-11D illustrate operation of portions of a vehicle latch when it is in an emergency mode and operated with a mechanical release in accordance with an embodiment of the present disclosure.
Figure 12A:
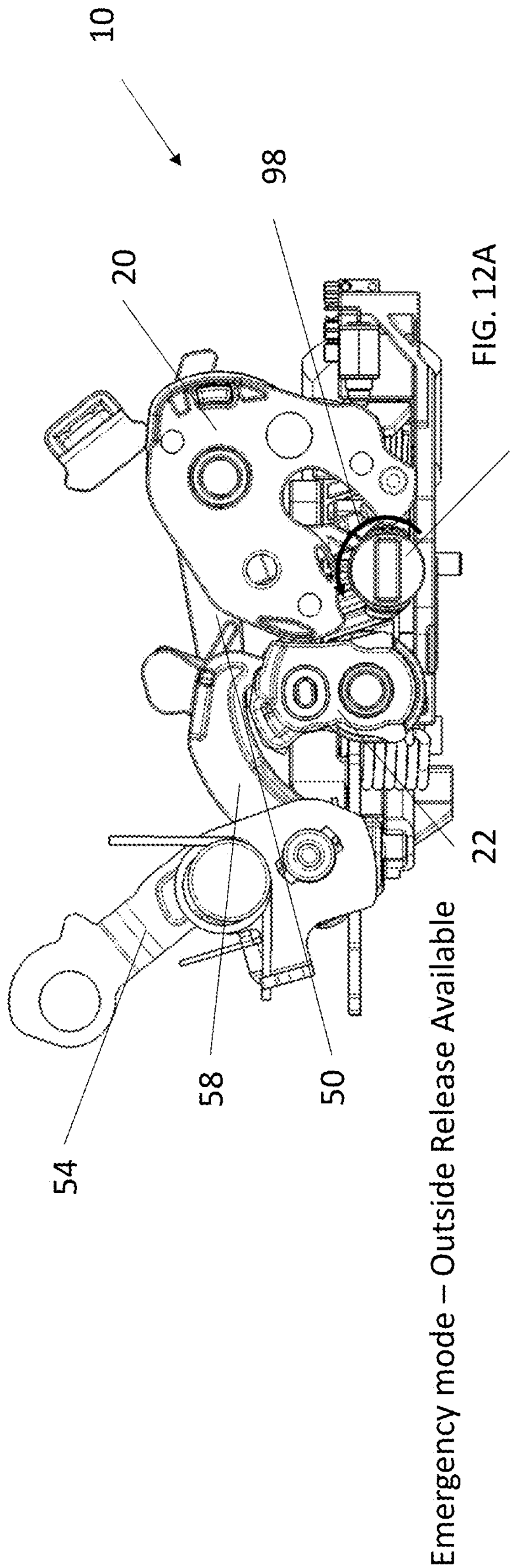
FIGS. 12A-12B illustrate operation of portions of a vehicle latch when it is in an emergency mode and operated with a mechanical lock in accordance with an embodiment of the present disclosure.

FIGS. 11A-11D illustrate operation of portions of the vehicle latch 10 when it is in an emergency mode and operated with a mechanical release in accordance with an embodiment of the present disclosure. In FIG. 11B, the outside release lever 54 has been moved in the direction of arrow 90 such that the pawl 26 is rotated in the direction of arrow 92 (FIG. 11B) so that the claw 20 can rotate to the door open position illustrated in FIG. 11C. FIG. 11D illustrates the latch 10 moving into the door closed position (FIG. 12A). As such, the latch can once again be opened with a mechanical release (e.g., operation of outside handle 52). FIG. 11A illustrates the latch 10 in the emergency mode for outside mechanical release while FIG. 11B illustrates the latch 10 in the emergency mode during outside mechanical release. FIG. 11C illustrates the latch 10 where the door is open in the emergency mode and FIG. 11D illustrates the latch 10 when the door is closed in the emergency mode.

Since it may be desirable to lock the latch 10 when it is in the emergency mode an emergency lock knob, button or mechanical lock 96 may be provided in one embodiment. Emergency lock knob or button 96 is operably coupled to the lock link 50 such that rotation of the emergency lock knob or button 96 in the direction of arrow 98 will cause rotation of the lock link 50 which is operably coupled to the lever 58 such that movement of the lock link 50 will cause movement of the lever 58 from the second position where the lever 58 is operably coupled to the pawl 26 (see at least FIGS. 11A-11D and 12A) to the first position (see at least FIGS. 5A-5C and 12B) where the lever 58 is not operably coupled to the pawl 26. As such and when the latch 10 is closed to the door closed position when the emergency lock knob or button 96 is rotated in the direction of arrow 98 when the latch 10 is in the emergency mode, the latch 10 will be locked once it is moved to the door closed position. As such, manual mechanical release of the latch via actuation of the outside handle 52 will no longer be possible.

Figure 12B:
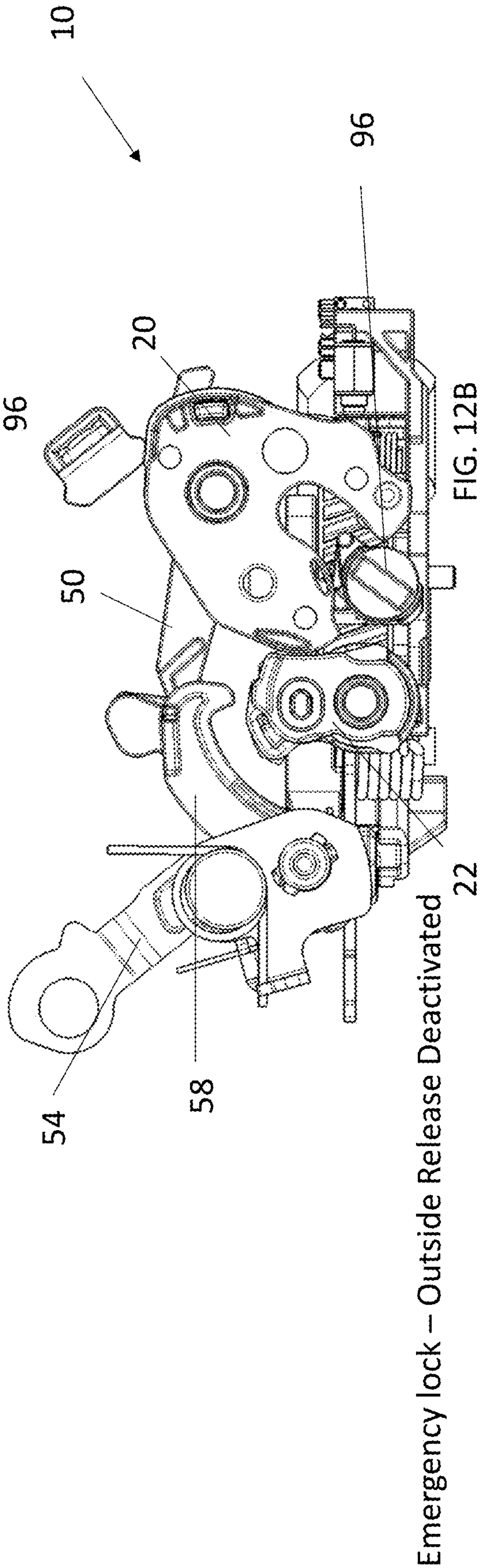

FIG. 12A illustrates the latch 10 in the emergency mode where outside release is available and FIG. 12B illustrates the latch 10 in emergency lock where outside release is deactivated.

In one non-limiting embodiment, the emergency lock knob or button 96 is located in area such that it is accessible from an exterior once the vehicle door latch 10 is associated with is opened. Although one specific location of the emergency lock knob or button 96 is illustrated in the attached FIGS. other locations are contemplated to be within the scope of the present disclosure.

Figures 13A, 13B, 13C:
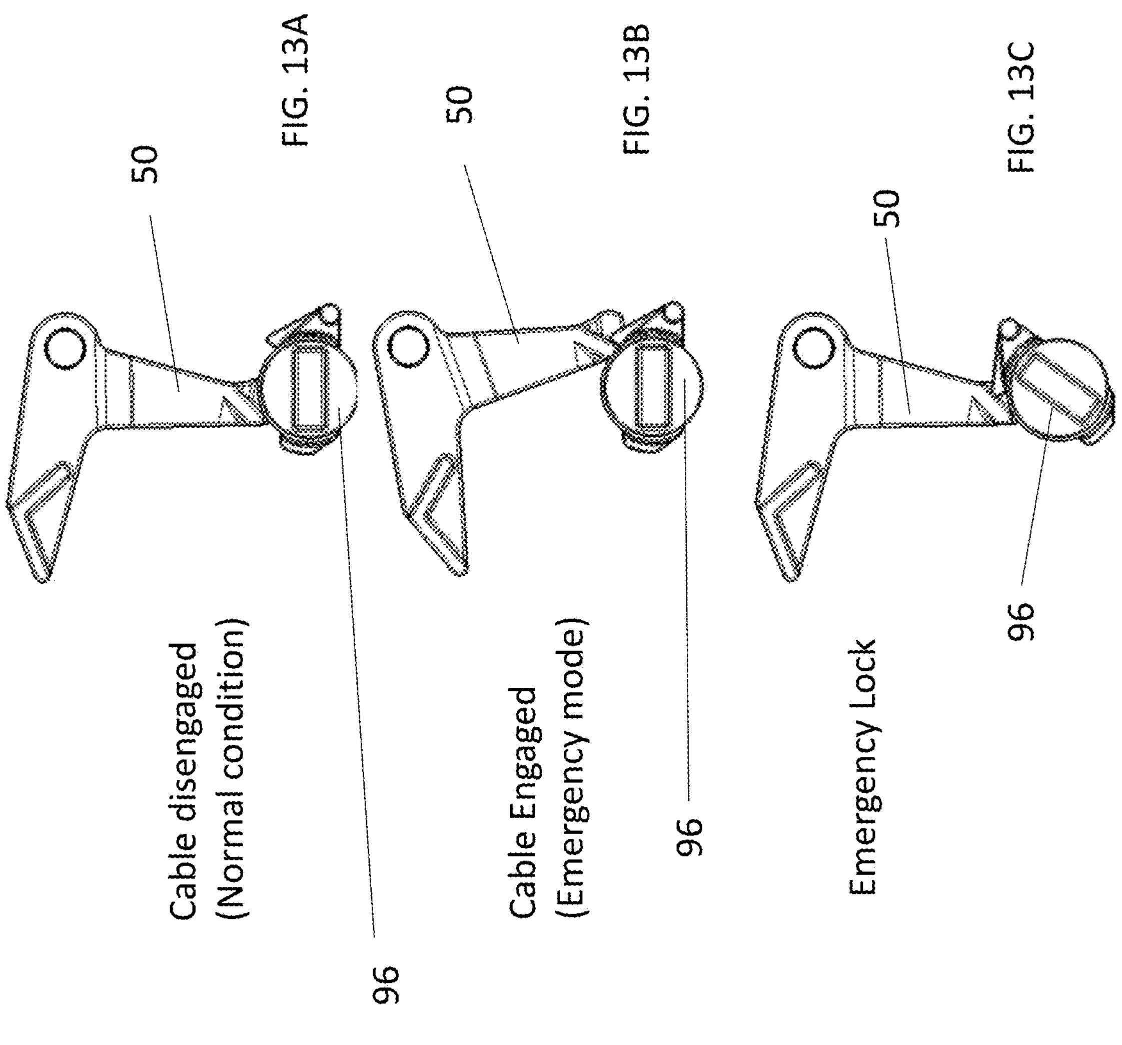
FIGS. 13A-13C illustrate operation of portions of a vehicle latch when it is in an emergency mode in accordance with an embodiment of the present disclosure.

FIGS. 13A-13C illustrate movement of the lock link 50 via operation of the emergency lock, knob or button 96. In FIG. 13A, the latch 10 is in the normal condition where the cable 56 from the outside handle 52 is disengaged (e.g., movement of release lever 54 will not open the latch 10). In FIG. 13B, the latch 10 is in the emergency mode where the cable 56 from the outside handle 52 is engaged (e.g., movement of release lever 54 will open the latch 10). In FIG. 13C, the latch 10 is in the emergency mode where the emergency lock, knob or button 96 has been rotated so that the lock link 50 is rotated and the cable 56 from the outside handle 52 is disengaged (e.g., movement of release lever 54 will not open the latch 10).

Figures 14A, 14B, 14C, 14D:
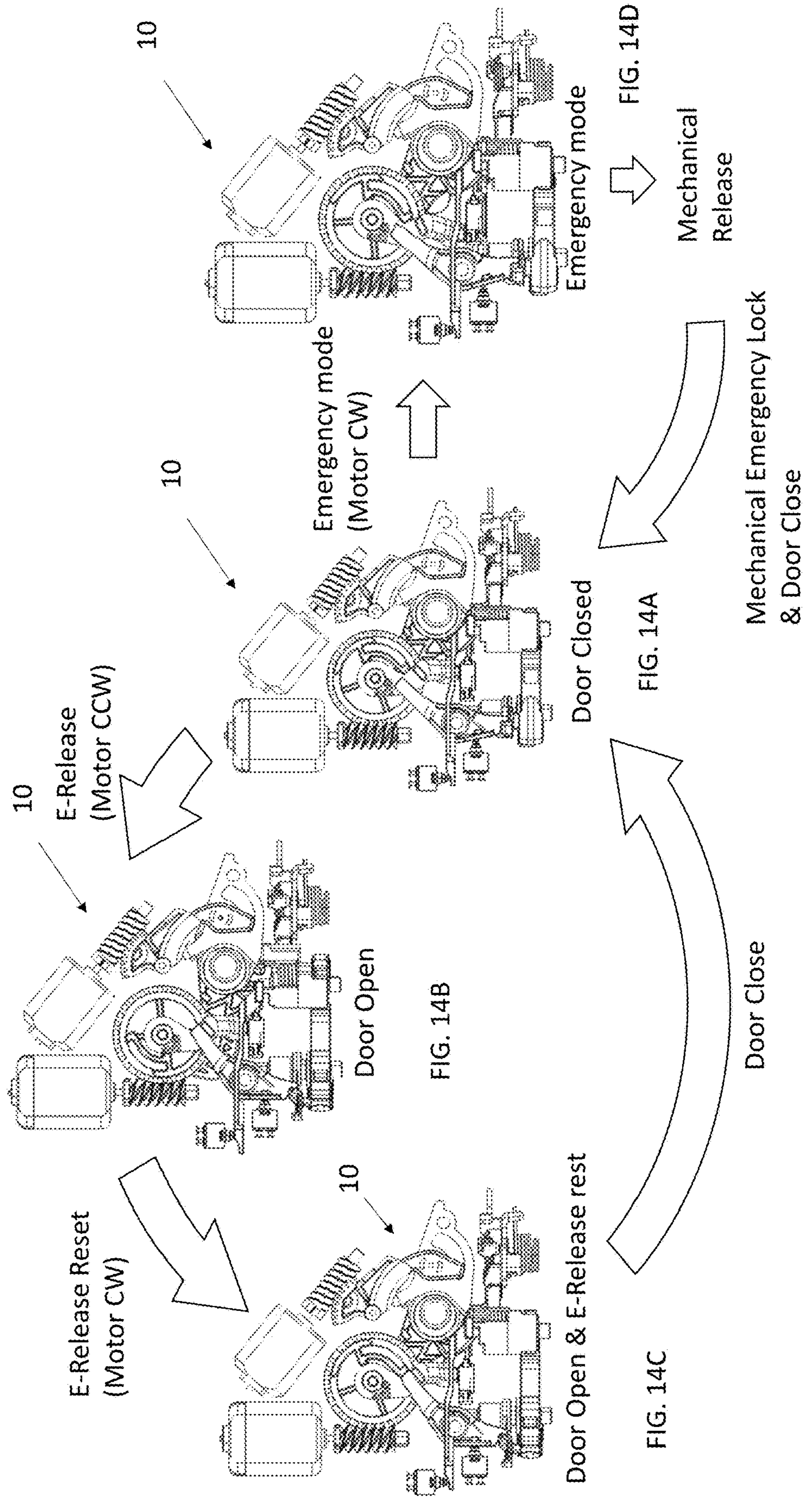
FIGS. 14A-14D illustrate operation of portions of a vehicle latch in accordance with an embodiment of the present disclosure.
Figure 15B:
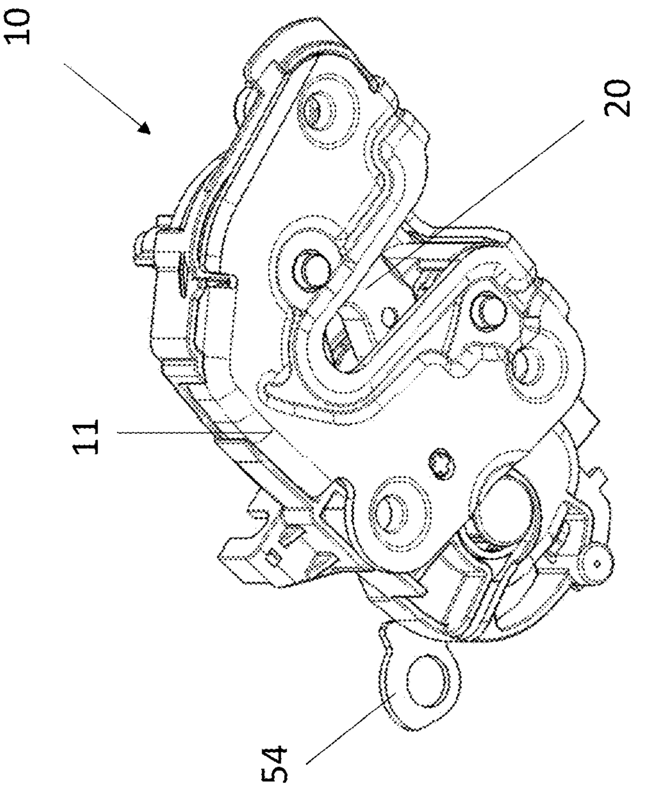
FIGS. 15A and 15B are perspective views of a vehicle latch without the actuator in accordance with an embodiment of the present disclosure.
Figure 15A:
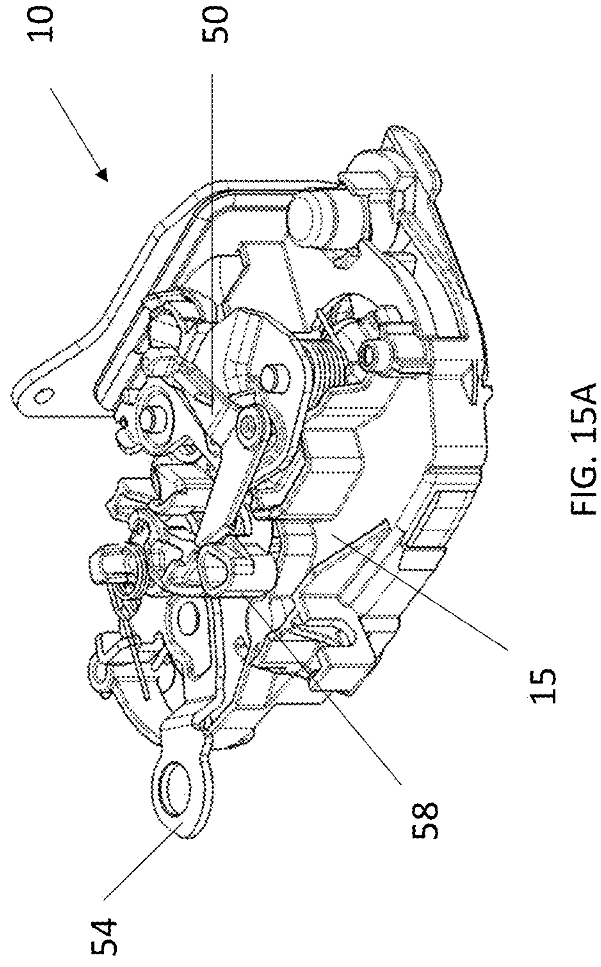

FIGS. 14A-14D illustrate operation of the vehicle latch 10 in accordance with an embodiment of the present disclosure. In FIG. 14A, the latch 10 is in a door closed position. In FIG. 14B the motor 30 has rotated the wheel 34 in a counter clock wise direction from FIG. 14A and the latch is now in the door open position. Once the latch 10 is the door open position the motor 30 rotates the wheel 34 in a clockwise direction from FIG. 14B back to the position illustrated in FIG. 14A however the claw 20 is in the open position and the block lever 44 is moved to a position where it will prevent further rotation of the wheel 34. FIG. 14D illustrates the latch after the motor 30 has rotated the wheel in a clockwise direction from FIG. 14A wherein the wheel 34 via the driving feature 40 has contacted the unlocking lever 48 to move the lock link 50 such that the pawl 26 is operably coupled to the outside handle 52 such that the latch 10 is in the emergency mode wherein operation of the outside handle 52 will cause movement of the pawl 26 so the latch 10 can be opened.

FIG. 14A illustrates the latch 10 after it has been moved back into a closed position from either FIG. 14C or 14D.

As noted, a single motor (motor 30) is used to manipulate the wheel 34 in clockwise and counter clockwise directions with respect to the position illustrated in at least FIG. 14A such that the latch 10 can be manipulated into either a door open position via electric release or an emergency mode where operation of an outside handle can mechanically open the latch 10.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle latch, comprising:

a claw rotatably mounted to a pin;

a pawl rotatably mounted to pin;

a single motor for electrically releasing the claw of the latch and for electrically moving the latch into an emergency mode wherein the latch can be mechanically opened via a handle operably coupled to the latch; and a wheel rotatably mounted to the latch, the single motor drives a worm that meshingly engages the wheel, the wheel has a cam portion located on one side of the wheel and a driving feature located on an opposite side of the wheel, wherein the cam portion is configured to engage a release lever, the release lever being operably coupled the pawl such that movement of the release lever by the cam portion of the wheel will cause movement of the pawl and wherein the driving feature is configured to engage a block lever, the block lever being operably coupled to the claw via a door ajar cam such that movement of the claw will cause movement of the block lever.

2. The vehicle latch as in claim 1, wherein the worm meshingly engages a plurality of teeth located about a periphery of the wheel.

3. The vehicle latch as in claim 1, wherein an unlocking lever is rotatably mounted to the wheel and wherein the driving feature is configured to contact and rotate the unlocking lever as the wheel is rotated, wherein the unlocking lever is operably coupled to a lock link such that movement of the unlocking lever will cause movement of the lock link and wherein the latch further comprises an outside release lever operably coupled to a lever that is also operably coupled to the lock link such that movement of the lock link will cause movement of the lever from a first position where the lever is not operably coupled to the pawl and a second position where the lever is operably coupled to the pawl.

4. The vehicle latch as in claim 1, wherein the single motor manipulates the wheel in clockwise and counter clockwise directions.

5. The vehicle latch as in claim 3, wherein the outside handle is operably coupled to the outside release lever via a cable.

6. The vehicle latch as in claim 5, wherein the outside handle is located on an outside surface of a vehicle door the latch is associated with.

7. The vehicle latch as in claim 6, further comprising: an emergency lock knob, the emergency lock knob being operably coupled to the lock link such that rotation of the emergency lock knob will cause rotation of the lock link such that movement of the lock link will cause movement of the lever from the second position to the first position.

8. A method of opening a vehicle latch with a single motor, comprising:

operating the single motor in a first direction for electrically releasing a claw of the latch and operating the single motor in a second direction for electrically moving the latch into an emergency mode wherein the latch can be mechanically opened via a handle operably coupled to the latch, wherein the single motor drives a worm that meshingly engages a wheel rotatably mounted to the latch and the wheel has a cam portion located on one side of the wheel and a driving feature located on an opposite side of the wheel, wherein the cam portion is configured to engage a release lever, the release lever being operably coupled a pawl such that movement of the release lever by the cam portion of the wheel will cause movement of the pawl and wherein the driving feature is configured to engage a block lever, the block lever being operably coupled to the claw via a door ajar cam such that movement of the claw will cause movement of the block lever.

9. The method as in claim 8, wherein the single motor manipulates the wheel in clockwise and counter clockwise directions.

10. The method of claim 8, wherein the worm meshingly engages a plurality of teeth located about a periphery of the wheel.

11. The method as in claim 8, wherein an unlocking lever is rotatably mounted to the wheel and wherein the driving feature is configured to contact and rotate the unlocking lever as the wheel is rotated, wherein the unlocking lever is operably coupled to a lock link such that movement of the unlocking lever will cause movement of the lock link and wherein the latch further comprises an outside release lever operably coupled to a lever that is also operably coupled to the lock link such that movement of the lock link will cause movement of the lever from a first position where the lever is not operably coupled to the pawl and a second position where the lever is operably coupled to the pawl.

12. The method as in claim 11, wherein the outside handle is operably coupled to the outside release lever via a cable.

13. The method as in claim 12, wherein the outside handle is located on an outside surface of a vehicle door the latch is associated with.

14. The method as in claim 13, further comprising: an emergency lock knob, the emergency lock knob being operably coupled to the lock link such that rotation of the emergency lock knob will cause rotation of the lock link such that movement of the lock link will cause movement of the lever from the second position to the first position.

* * * * *